(12) United States Patent
Barnes et al.

(10) Patent No.: US 8,009,959 B2
(45) Date of Patent: Aug. 30, 2011

(54) OPTICAL INTERCONNECTION METHODS FOR HIGH-SPEED DATA-RATE OPTICAL TRANSPORT SYSTEMS

(75) Inventors: Ray S. Barnes, Hickory, NC (US); John D. Coleman, Hickory, NC (US); Alan W. Ugolini, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/486,427

(22) Filed: Jun. 17, 2009

(65) Prior Publication Data

US 2010/0322554 A1    Dec. 23, 2010

(51) Int. Cl.
  *G02B 6/00*   (2006.01)
  *G02B 6/38*   (2006.01)
(52) U.S. Cl. ............................. 385/147; 385/14; 385/59
(58) Field of Classification Search .................. None
  See application file for complete search history.

(56) References Cited

U.S. PATENT DOCUMENTS

| | | | |
|---|---|---|---|
| 6,364,539 B1 | 4/2002 | Shahid | 385/83 |
| 6,758,600 B2 | 7/2004 | Del Grosso et al. | 385/71 |
| 6,869,227 B2 | 3/2005 | Del Grosso et al. | 385/71 |
| 7,237,966 B2 | 7/2007 | Quinby et al. | 385/78 |
| 2004/0179771 A1 | 9/2004 | Verhagen et al. | 385/17 |
| 2005/0152640 A1 | 7/2005 | Lemoff | 385/24 |
| 2006/0034573 A1 | 2/2006 | Guan et al. | 385/123 |
| 2006/0133736 A1* | 6/2006 | Sullivan | 385/59 |
| 2008/0205824 A1 | 8/2008 | Cody et al. | 385/59 |

OTHER PUBLICATIONS

Tyco Electronics, High Density PARA-OPTIX Cable Assemblies and Enclosures, Paper Jul. 26, 2007. www.ampnetconnect.com/documents/Paraoptix.pdf, pp. 1-2.

* cited by examiner

*Primary Examiner* — Charlie Peng
*Assistant Examiner* — Eric Wong

(57) ABSTRACT

Optical interconnection methods for high-speed data-rate optical transport systems are disclosed that optically interconnect active assemblies to a fiber optic cable in a polarization-preserving manner. The methods include defining active-assembly-wise connector ports that connect to active assembly transmit and receive ports, and defining or establishing a pairings method between the active-assembly-wise connector ports. In a first optical interconnection assembly, an active-assembly-wise port is optically connected to a cable-wise port. In the second optical interconnection assembly, the cable-wise port that corresponds to the connected cable-wise port in the first optical interconnection assembly is optically connected to a select active-assembly-wise port as defined by the pairings method. The optical connection process is then repeated from the second to the first optical interconnection assembly. The optical interconnection acts are repeated until all of the active-assembly-wise ports are connected.

20 Claims, 16 Drawing Sheets

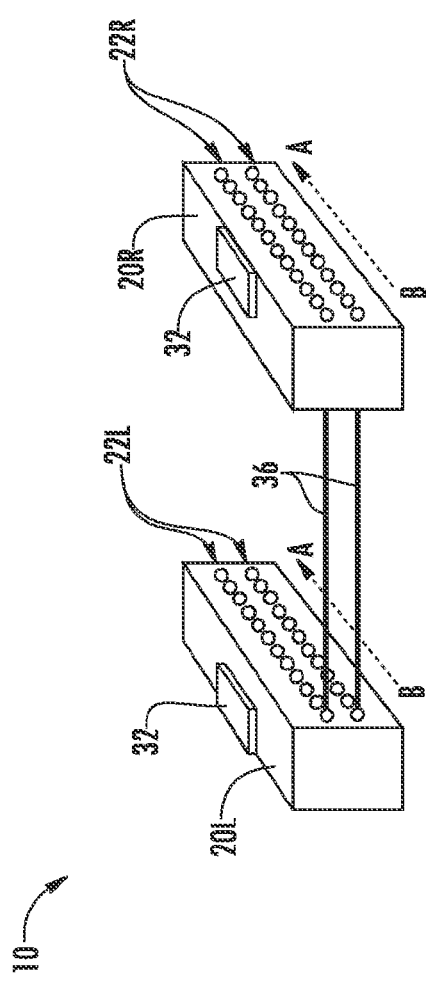
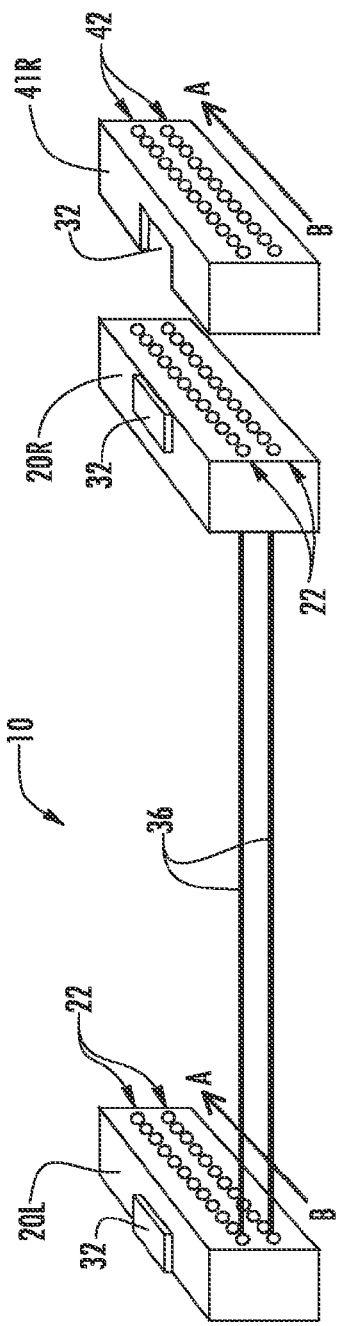
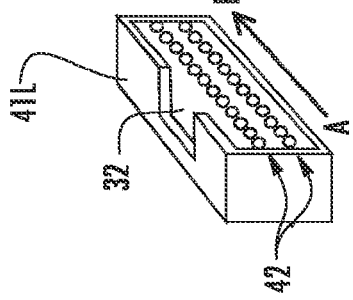
FIG. 1 (PRIOR ART)
FIG. 2 (PRIOR ART)

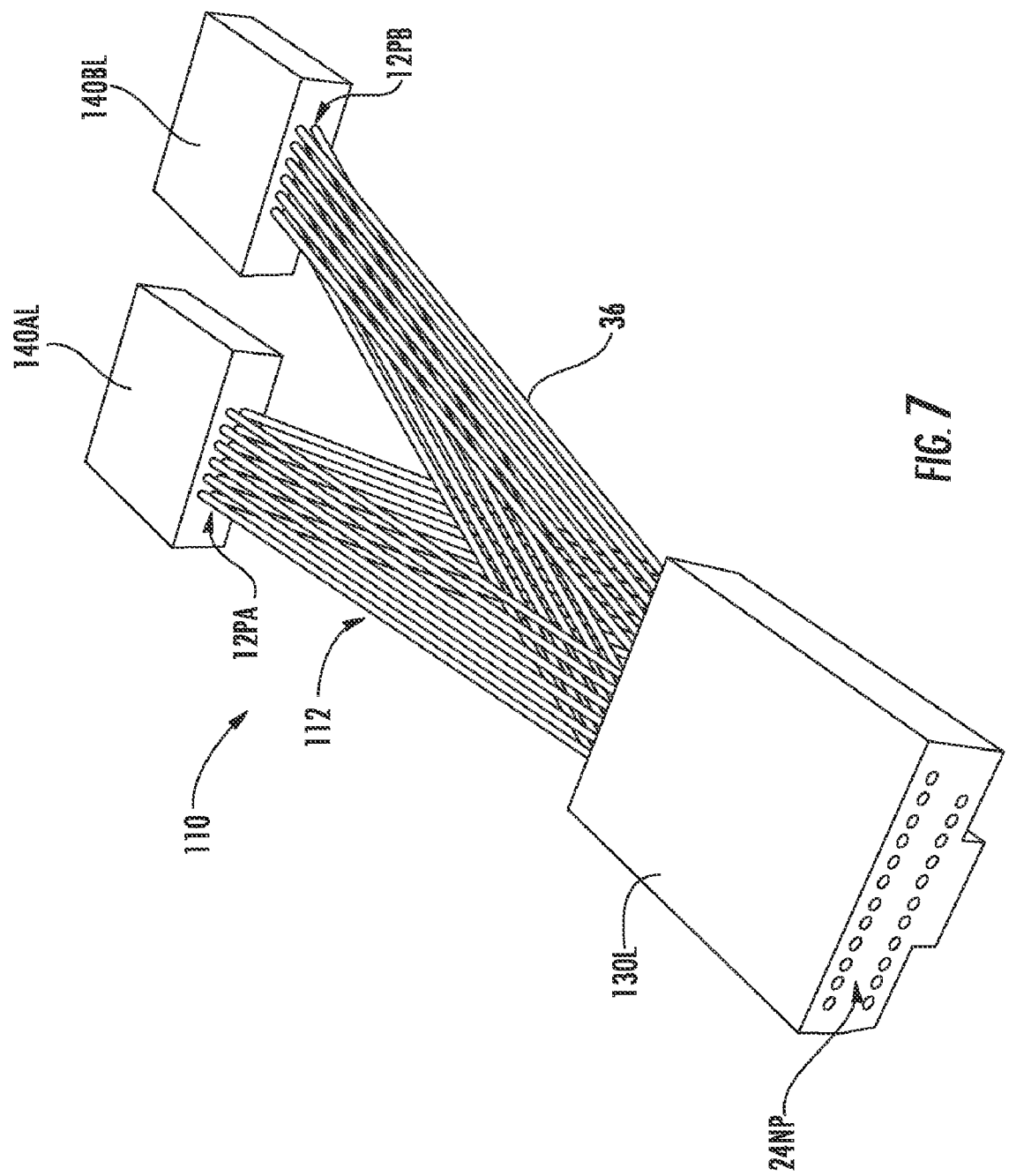

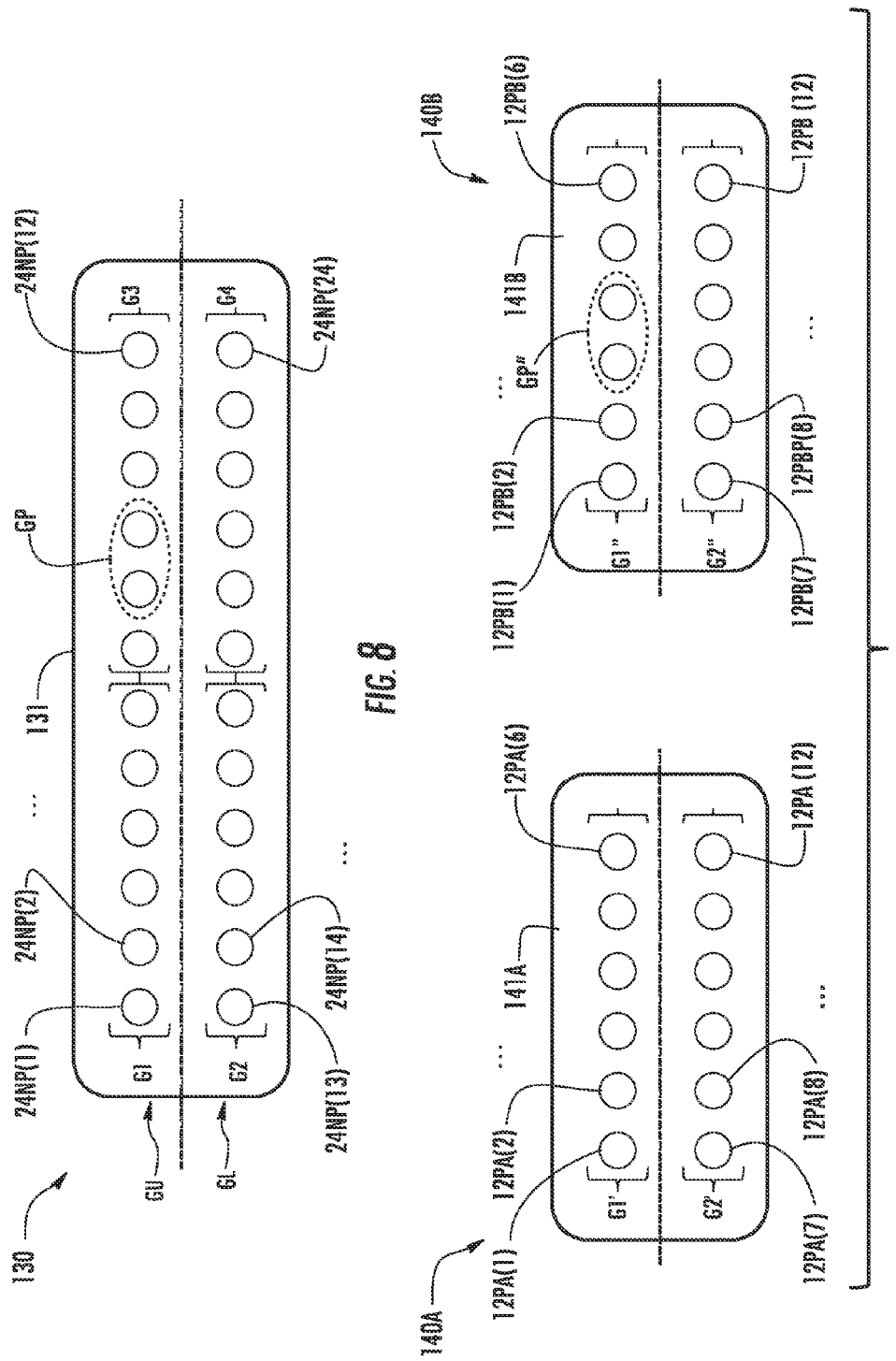

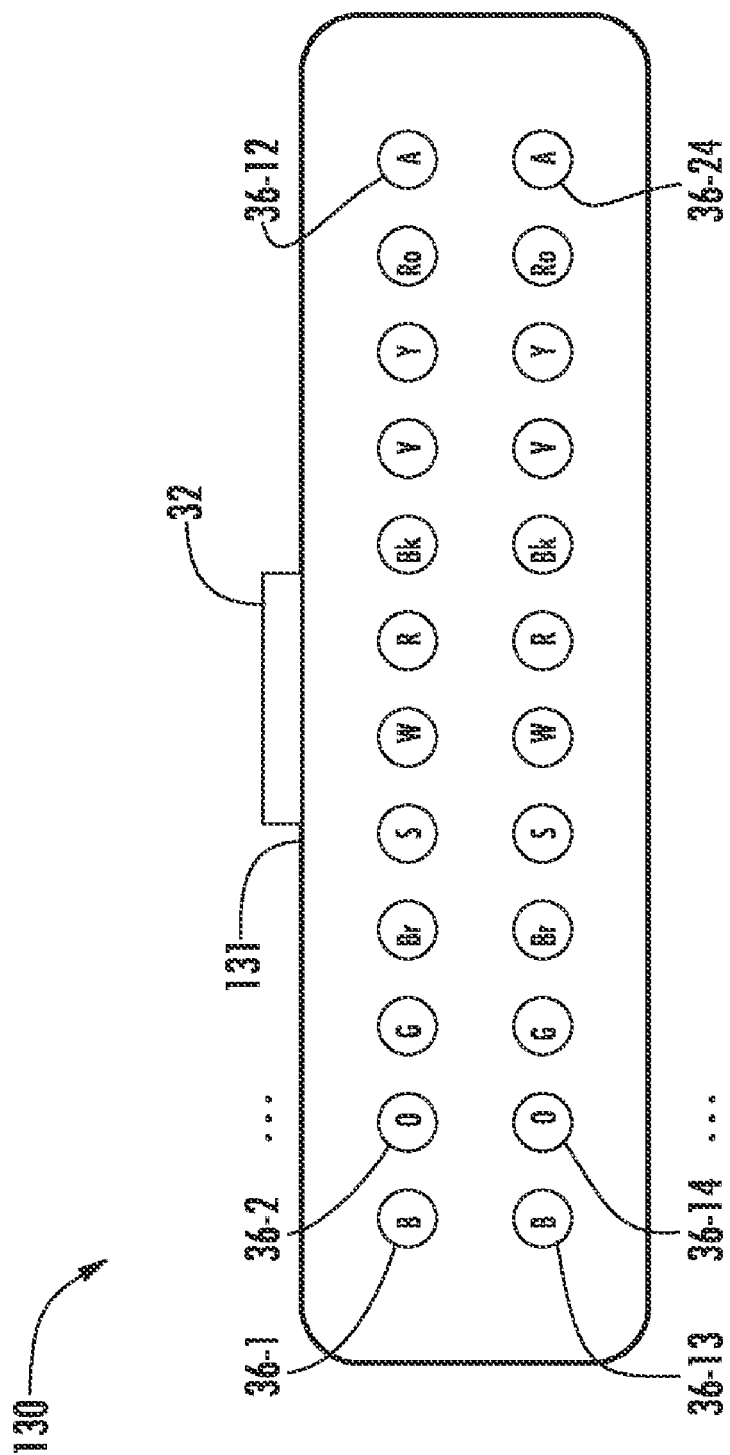

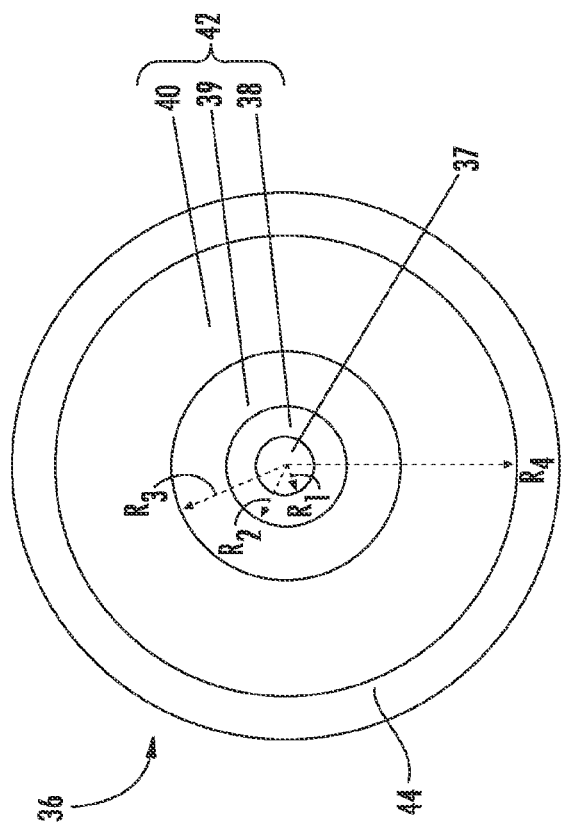
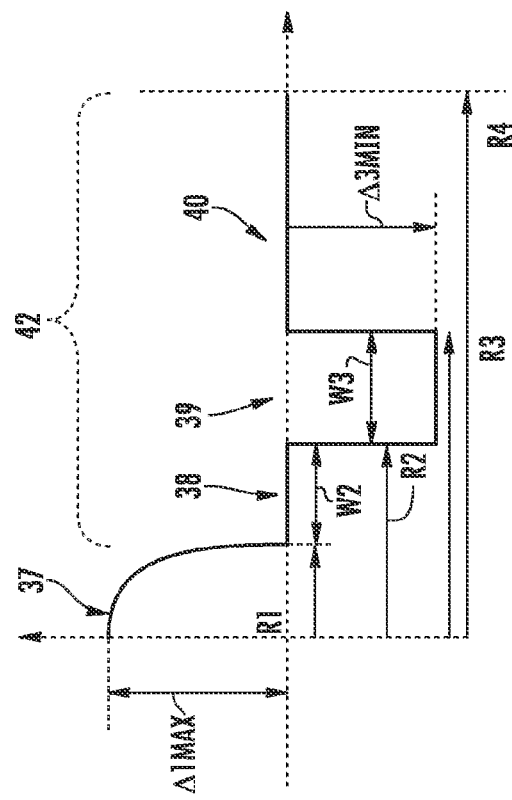
FIG. 12
FIG. 11

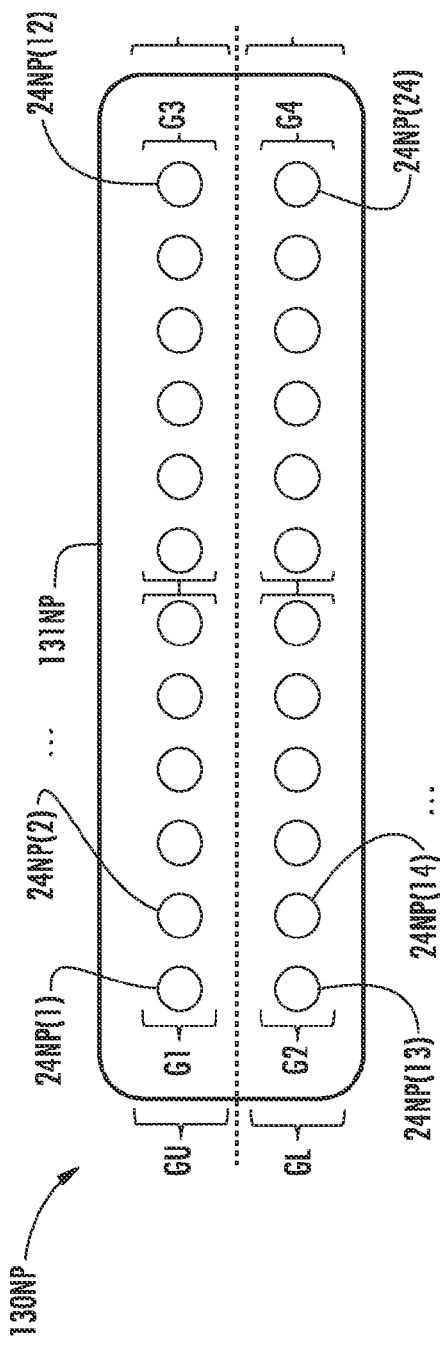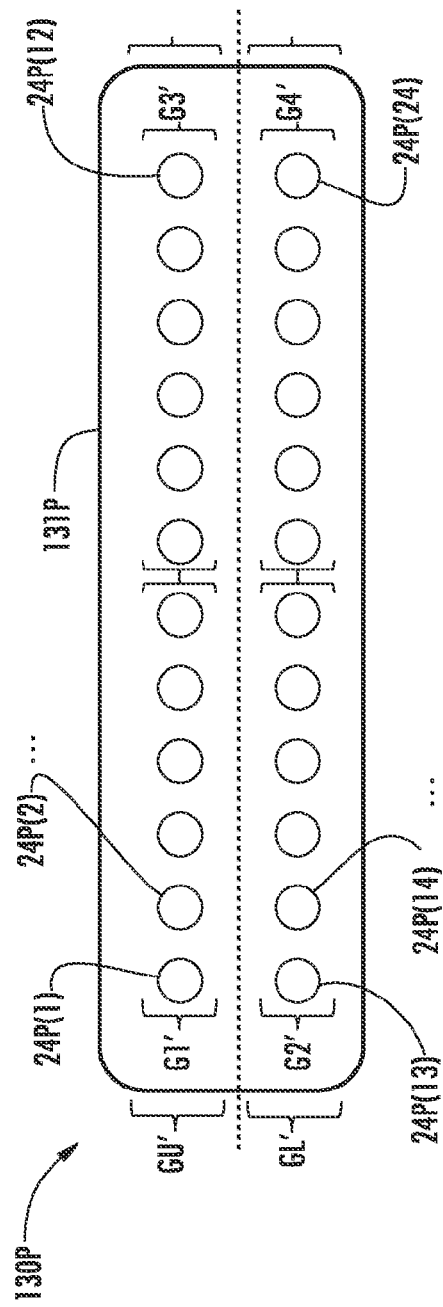

OPTICAL INTERCONNECTION METHODS FOR HIGH-SPEED DATA-RATE OPTICAL TRANSPORT SYSTEMS

TECHNICAL FIELD

The present disclosure relates to optical fiber networks, and in particular to optical interconnection methods for high-speed data-rate optical transport systems that use multifiber connectors.

BACKGROUND ART

Some conventional optical fiber networking solutions for high-speed data-rate optical transport systems utilize 12-fiber (12f) connector assemblies and often have a point to point configuration. The conservation of fiber polarity (i.e., the matching of transmit and receive functions for a given fiber) is addressed by flipping fibers in one end of the assembly just before entering the connector in an epoxy plug, or by providing "A" and "B" type break-out modules where the fiber is flipped in the "B" module and "straight" in the "A" module. Polarity preserving optical interconnection assemblies that provide fiber optic interconnection solutions for multifiber connectors in a network environment are discussed in U.S. Pat. Nos. 6,758,600 and 6,869,227, which patents are assigned to the present assignee or its affiliate and which patents are incorporated by reference herein.

Storage Area Networks (SANs) utilize SAN directors having high-density input/output ("I/O") interfaces called "line cards." Line cards hold multiple optical active assemblies such as transceivers that convert optical signals to electrical signals and vice versa. The line cards have connectors with transmit ports {0T, 01T, 02T, ... } and receive ports {0R, 01R, 02R, ... } into which network cabling is plugged. The number of ports per line card can generally vary, e.g., 16-, 24-32- and 48-port line cards are available.

For high-speed data-rate optical transport systems, such as 100 gigabit (100G) optical fiber networks, one of the anticipated line-card connector interfaces is a 24-fiber multi-fiber push-on (MPO) connector, such as an MTP® connector. This is potentially problematic because existing network systems and some planned for high-speed data-rate optical transport systems are based on 12-fiber MPO connectors. Likewise, if 24-fiber trunk connections are implemented, 24-fiber to 24-fiber patch cords that provide a connection that maintains fiber polarity between active assemblies such as transceivers would facilitate high-speed data-rate optical transport systems implementation.

SUMMARY

An exemplary aspect of the disclosure is a method of configuring first and second optical interconnection assemblies for connecting, in a polarity-preserving manner, first or second multi-fiber active assemblies to a fiber optic cable in a high-speed data-rate optical transport system. The method includes defining active-assembly-wise and cable-wise connector ports for the first and second assemblies, wherein the first and second cable-wise ports correspond via the fiber optic cable. The method also includes determining or establishing a pairing method between the active-assembly-wise ports of the first and second assemblies based on preserving polarity between corresponding transmit ports {0T, 01T, ... 23T} and receive ports {0R, 01R, ... 23R} of the first and second transceivers. The method further includes optically connecting in the first assembly one of the active-assembly-wise ports to one of the cable-wise ports. The method also includes optically connecting in the second assembly the cable-wise port corresponding to the first-assembly cable-wise port of the previous act to the corresponding active-assembly-wise port as defined by the pairing method. The method additionally includes performing the previous two acts in the opposite direction from the second assembly to the first assembly, and carrying out the connection acts for the remaining unconnected assembly ports.

Another exemplary aspect of the disclosure is a method of connecting first and second transceivers to a fiber optic cable in a high-speed data-rate optical transport system. The method includes providing first and second optical interconnection assemblies having respective active-assembly-wise ports $24NPL(x_L)$ and $24NPR(x_R)$ for $1 \leq x_L$, $x_R \leq 24$ and respective cable-wise ports $24PL(y_L)$ and $24PR(y_R)$ for $1 \leq y_L$, $y_R \leq 24$, wherein the cable-wise ports $24PL(y_L)$ and $24PR(y_R)$ correspond to each other via the fiber optic cable. The method also includes determining or establishing a pairings method between active-assembly-wise ports $24NPL(x_L)$ and $24NPL(x_R)$ based on preserving polarity between corresponding transmit ports {0T, 01T, ... 23T} and receive ports {0R, 01R, ... 23R} of the first and second transceivers. The method further includes forming in the first assembly a first optical connection between one of the active-assembly-wise ports $24NPL(x_L)$ and any of the unconnected cable-wise connector ports $24PL(y_L)$. The method additionally includes forming in the second assembly a second optical connection between the cable-wise port $24PR(y_R)$ that corresponds to the connected cable-wise port $24PL(y_L)$ of act c) and the active-assembly-wise port $24NPR(x_R)$ as defined by the polarity preserving relationship. The method also includes repeating the optical connections formed in the previous act from active-assembly-wise port $24NPR(x_R)$ to active-assembly-wise port $24NPL(x_L)$. The method then includes repeating the three previous acts for the unconnected active-assembly-wise and cable-wise ports of the first and second assemblies until all active-assembly-wise ports $24NPL(x_L)$ and $24NPR(x_R)$ are optically connected.

Another exemplary aspect of the disclosure is a method of forming a fiber optic assembly for a high-speed data-rate optical transport system having active assemblies each with transmit and receive ports. The method comprises providing at least first and second multifiber connectors each having respective pluralities of first and second ports that define respective pluralities of at least first and second groups of at least two ports each. The first and second multifiber connectors are capable of being disposed so that the at least first and second groups of ports are located on respective termination sides of each ferrule. The method also includes connecting the first and second ports with a plurality of optical fibers according to a pairings method that maintains polarity between the transmit and receive ports of the active assemblies. This includes optically connecting at least one of the first and second groups of ports without flipping the fibers, and also includes optically connecting at least one of the first and second groups of ports by flipping the fibers.

BRIEF DESCRIPTION OF THE DRAWINGS

FIG. 1 is a schematic diagram of a prior art twenty-four-fiber (24f) fiber optic "trunk" cable having two connectors with "key up" configurations;

FIG. 2 is a schematic diagram similar to FIG. 1, but further including two 24f connectors associated with system active assemblies (not shown), illustrating how the system as shown fails to provide a connection having the proper transmit/ receive polarity between the active assemblies;

FIG. 7 is a perspective view of a 24f↔2×12f optical fiber interconnection assembly illustrating an example of how the optical fibers of the harness are routed in three-dimensions;

FIG. 8 is an end-on view of active-assembly-wise 24f connector of an optical fiber interconnection assembly illustrating how the connector ports can be divided up into different groups;

FIG. 9 is an end-on view of cable-wise 2×24f connectors of an optical fiber interconnection assembly illustrating how the connector ports can be divided up into different groups;

FIG. 10 is an end-on, key-up view of the active-assembly-wise 24f connector of an optical fiber interconnection assembly, showing an example of how the fibers in the top and bottom rows run left to right according to the color code Blue, Orange . . . Aqua, i.e., "B→A";

FIG. 11 shows a schematic representation of the refractive index profile of a cross-section of the glass portion of an embodiment of a multimode optical fiber;

FIG. 12 is a schematic representation (not to scale) of a cross-sectional view of the optical fiber of FIG. 11;

FIG. 16 and FIG. 17 are end-on views of the assembly-wise and cable-wise 24f connectors of the 24f↔24f optical fiber interconnection assembly, illustrating how the connector ports can be divided up into different groups;

Figure 3:
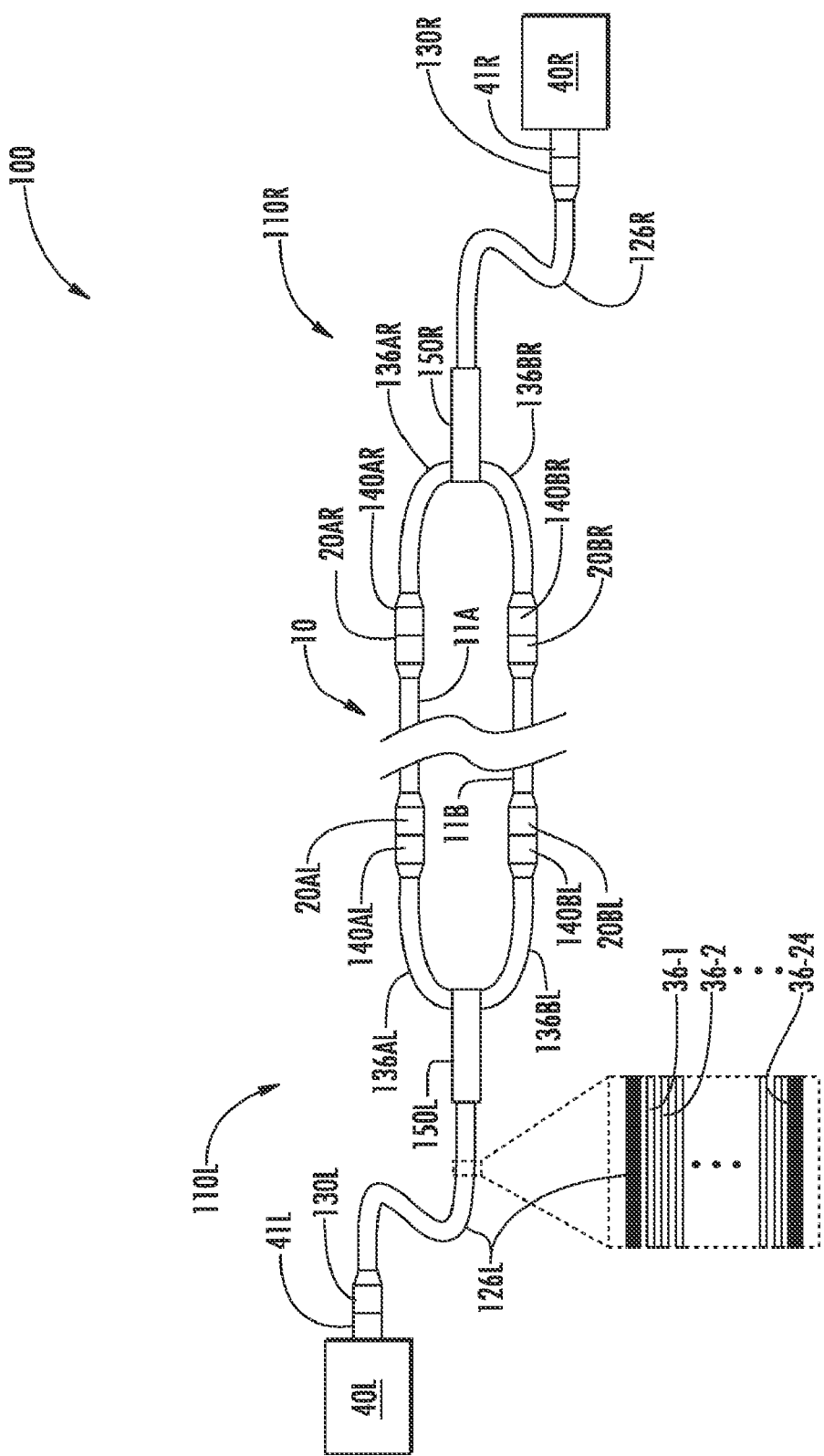
FIG. 3 is a schematic diagram of an example embodiment of an example high-speed data-rate optical transport systems that includes two 24f↔2×12f optical fiber interconnection assemblies in the form of patch cords.

It is to be understood that both the foregoing general description and the following detailed description present embodiments of the disclosure, and are intended to provide an overview or framework for understanding the disclosure as it is claimed. The accompanying drawings are included to provide a further understanding of the disclosure, and are incorporated into and constitute a part of this specification. The drawings are not necessarily to scale.

DETAILED DESCRIPTION

Reference is now made in detail to the embodiments of the disclosure, examples of which are illustrated in the accompanying drawings. Whenever possible, like or similar reference numerals are used throughout the drawings to refer to like or similar parts. The letters "L" and "R" in the reference numbers denote "left" and "right" to distinguish between the same or like parts in different sections of an apparatus, system, assembly or network, and are used in the same manner as "first" and "second" and thus are not intended as being limiting as to position.

It should be understood that the embodiments disclosed herein are merely examples, each incorporating certain benefits of the present disclosure. Various modifications and alterations may be made to the following examples within the scope of the present disclosure, and aspects of the different examples may be mixed in different ways to achieve yet further examples. Accordingly, the scope of the disclosure is to be understood from the entirety of the present disclosure, in view of but not limited to the embodiments described herein.

An aspect of the present disclosure is directed to optical fiber interconnection (or "conversion") assemblies configured to convert or otherwise interconnect multifiber connectors. Multifiber connectors considered herein by way of example are twenty-four-fiber ("24f") connectors and twelve-fiber ("12f") connectors. In an example embodiment, the multifiber connectors comprise multifiber ferrules. The ferrules each have a mating face for mating to another optical fiber connector and a termination side for connection to optical fibers of an optical fiber cable. One example optical fiber interconnection assembly is configured to connect a 24f connector having twenty-four ports to two 12f connectors each having twelve ports. This interconnection assembly is referred to generally as a "24f↔2×12f assembly." Another example optical fiber interconnection assembly is configured to convert or otherwise interconnect one 24f connector to another 24f connector. This interconnection assembly is referred to generally as a "24f↔24f assembly."

The optical interconnection assemblies of the present disclosure can be embodied in a variety of different forms, such as an individually formed enclosure with one or more walls in module form (e.g., a stamped-formed metal box), a flexible substrate with optical fibers associated therewith, a cable section, as an optical fiber harness or bundles of arrayed optical fibers and connectors, as an optical fiber patch cord, or in fiber-optic cabling generally. The interconnection assemblies can include combinations of the foregoing. Aspects of the disclosure include cable systems that use the interconnection assemblies described herein.

The term "harness" as used herein means a collection of optical fibers, including fibers bound in groups or sub-groups as by a wrapping, adhesive, tying elements, or other suitable collecting fixtures or assemblies, or fibers that are unbound, for example, loose optical fibers without tying elements. The harness fibers may be arranged in the form of optical fiber ribbons, and the optical fiber ribbons are collected together by one or more tying elements or enclosed in a section of fiber optic cable.

The term "patch cord" as used herein is a collection of one or more optical fibers having a relatively short length (e.g., 2-4 meters), connectors at both ends, and that is typically used to provide for front-panel interconnections within an electronics rack, optical cross connect, or fiber distribution frame (FDF).

The term "trunk" means a fiber optic cable that carries multiple optical fibers (typically 4 to 96 fibers) and that connects assemblies over distances longer than that associated with patch cords, such as between electronics racks, rooms, buildings, central offices, or like sections of a network.

The term "port" is a fiber receiving area, i.e., a place where an optical fiber can be inserted or connected to another optical fiber.

Example multifiber connectors used in the assemblies and cables described below are epoxy and polish compatible MPO or MTP® connectors, for example, part of Corning Cable Systems' LANScape® connector solution set. Such connectors provide a very high fiber density and contain multiple optical paths arranged in a generally planar array. The optical paths are immediately adjacent to at least one other optical path for optical alignment with the optical fibers in an optical fiber cable. The multifiber connectors are designed for multi-mode or single-mode applications, and use a push/pull design for easy mating and removal. The multifiber connectors considered herein can be the same size as a conventional SC connector, but provide greater (e.g., 12×) fiber density, advantageously saving cost and space. Multifiber connectors can include a key for proper orientation for registration with any required optical adapters. The key can be configured as "key up" or "key down." Certain multifiber connectors such as MTP connectors may also include guide pins and guide holes that serve to align the optical fibers when the two connectors are engaged.

An optical connector adapter (not shown) may be used to manage the fiber connections. However, other connection schemes can be used, such as a ribbon fan-out kit.

In the discussion below and in the claims, the notation A↔B denotes connecting A to B. Likewise, the notation {a1, b1, c1 ... }↔{a2, b2, c2 ... } denotes connecting a1 to a2, b1 to b2, c1 to c2, etc. Also, the notation n≦p, q≦m is shorthand for n≦p≦m and n≦q≦m.

The assemblies, systems and methods described herein are directed generally to high-speed data-rate optical transport systems, e.g., systems that can optically transport information at rates such as between 10 gigabits (10G) and 120G. In a typical high-speed data-rate optical transport system, there are multiple channels, with each channel capable of supporting a select data rate, with the overall data rate determined by the data rate of the channels multiplied by the number of channels used. For example, a typical channel for a high-speed data-rate optical transport system can support 10 G communication, so for a twelve-channel system, the communication data rate can be adjusted in multiples of 10G from 10G to 120G. With the addition of more channels, or different data rates per channels, other data rates are obtained. Thus, there is a range of options for the particular system data rate, with 40G and 100G being possibilities.

FIG. 1 is a schematic diagram of a fiber optic cable 10 in the form of a 24f trunk cable ("24f trunk") having two multifiber connectors 20, e.g., right and left connectors 20R and 20L. Each connector 20 has ports 22 arranged in two rows of twelve and that are color-coded using industry-accepted color-coding scheme {B, O, G, Br, S, W, R, Bk, Y, V, Ro, A}={Blue, Orange, Green, Brown, Slate, White, Red, Black, Yellow, Violet, Rose and Aqua}. The direction of the color-coding scheme is indicated in FIG. 1 (as well as in FIG. 2) by the notation "B→A". Ports 22 are connected by corresponding color-coded optical fiber sections ("fibers") 36, with only two fibers being shown for the sake of illustration.

Connectors 20 have keys 32, and the two connectors 20L and 20R are configured "key up to key up." Fiber optic cable 10 is configured "key up to key up," so that the top and bottom rows of each connector 20 are respectively connected to their matching color-coded port 22 via fibers 36. Where necessary, individual fibers 36 are identified as 36-1, 36-2, etc. Connectors 20R and 20L have respective ports 22L and 22R.

FIG. 2 is a schematic diagram similar to FIG. 1, but further including two active assembly connectors 41 (e.g., 41R and 41L) associated with respective active assemblies (not shown), such as transceivers. Active assembly connectors 41L and 41R are arranged adjacent respective left and right connectors 20L and 20R. In one example, active assembly connectors 41 are or otherwise include medium dependent interface (MDI) connectors. Active assembly connectors 41 have ports 42. The upper row of twelve active assembly ports 42 are receive ports {0R, 1R, ... 11R}, while the lower row of active assembly ports 42 are transmit ports {0T, 1T, ... 11T}. Active assembly connectors 41 are by necessity arranged "key down" so that they can mate with the respective "key up" fiber optic cable connectors 20. The color-coding is thus A→B left to right. However, this configuration prevents fiber optic cable connectors 20 from patching directly into active assembly connectors 41 because the polarity of the connections between the transmit and receive ports of the active assembly connectors will not be maintained. A similar problem arises when trying to use a fiber optic cable 10 having two 12f cable sections and two 12f connectors at each cable end.

High-Speed Data-Rate Optical Transport System with 24f↔2×12f Interconnections

FIG. 3 is a schematic diagram of an example embodiment of an example high-speed data-rate optical transport system ("system") 100 that includes two example 24f↔2×12f assemblies 110. System 100 includes respective active assemblies 40 with the aforementioned connectors 41, and a fiber optic cable 10 having two 12f cable sections 11A and 11B each terminated at their respective ends by multifiber connectors 20A and 20B having respective twelve ports 22A and 22B. System 100 may be, for example, part of an optical fiber network, such as a LAN or a SAN at an optical telecommunications data center. An example active assembly is a transceiver, such as multichannel, high-data-rate (e.g., 10G/channel) transceiver.

Figure 4:
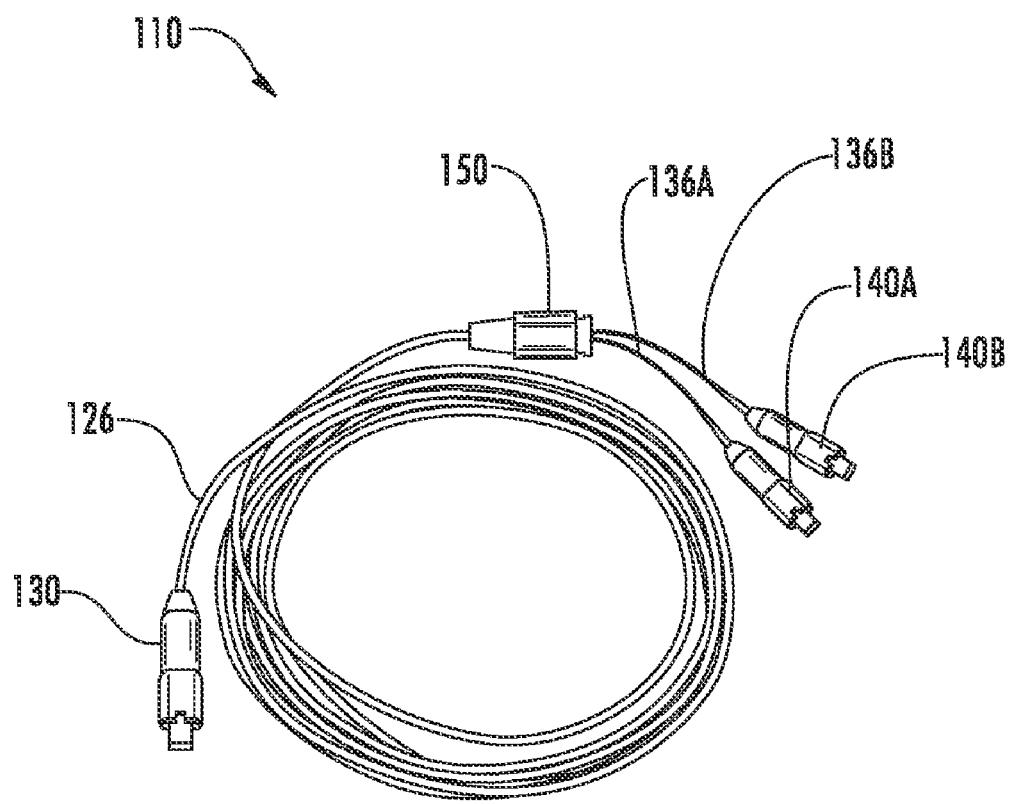
FIG. 4 is a perspective view of an example coiled 24f↔2×12f patch-cord optical fiber interconnection assembly.

System 100 includes first and second 24f↔2×12f assemblies 110L and 110R shown by way of example in the form of patch cords (also referred to hereinafter as "patch cord 110L" and "patch cord 110R", or more generally as "patch cord 110") that each connect the two 12f cable sections 11A and 11B to their respective active assembly connectors 41. FIG. 4 is a perspective view of an example coiled 24f↔2×12f patch cord. Each patch cord 110 includes a 24f cable section 126 terminated by a multifiber connector 130 configured to connect to active assembly connector 41. Patch cord connector 130 and its ports (described below) are thus referred to as being "active-assembly-wise." Each patch cord 110 also includes first and second 12f cable sections 136A and 136B terminated at respective ends by multifiber connectors 140A and 140B configured to connect with fiber optic cable connectors 20A and 20B in a key-up to key-down configuration (with connectors 140A and 140B being key up). Patch cord connector 140 and its ports (described below) are thus referred to as being "cable-wise." First and second 12f cable sections 136A and 136B are operably connected to first 24f cable section 126 via a furcation member 150. The 24f cable section 126 carries twenty-four fibers 36 (see inset in FIG. 3) while 12f cable sections 136A and 136B each carry twelve fibers 36. In example embodiments, furcation member 150 is a rigid ferrule or a flexible tube having about the same diameter as 24f cable section 126.

The fibers 36 in patch cords 110L and 110R is configured in a select manner so that the fiber polarity is maintained between active assemblies 40L and 40R at the respective ends of system 100. The twenty-four fibers 36 in patch cords 110L and 110R constitute respective harnesses 112L and 112R configured for 24f↔2×12f polarity-preserving interconnections. Further, patch cords 110 are configured so that they can be used at either end of system 100, i.e., patch cords 110L and 110R are interchangeable so that only one type of patch cord is needed for system 100. Example patch cords 110 are described in greater detail below. In an example embodiment, fibers 36 are bend-insensitive (or alternatively "bend resistant") fibers, as described in greater detail below.

Figure 5:
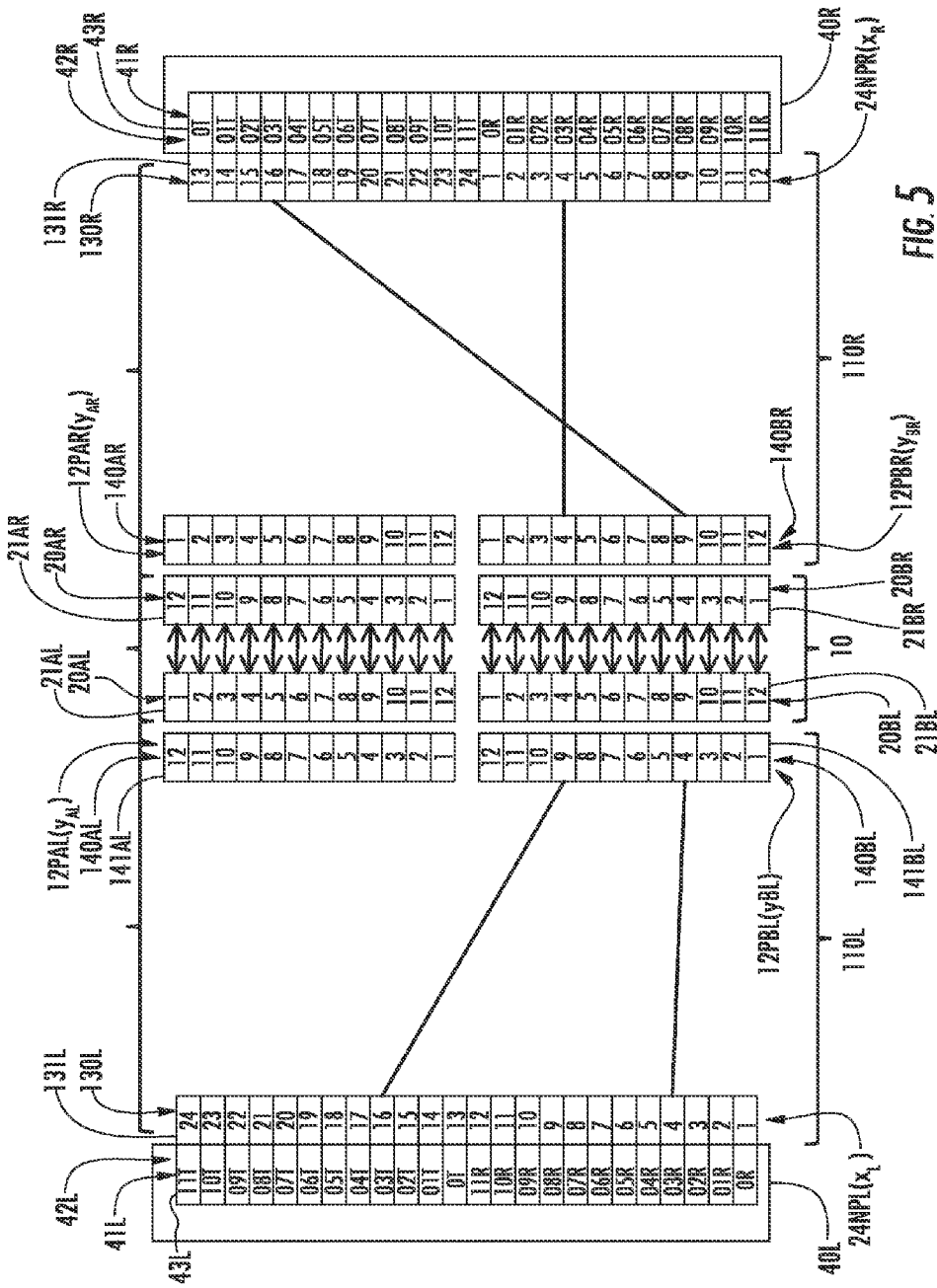
FIG. 5 is a schematic diagram of the system of FIG. 3, illustrating the various connector ports in more detail.

FIG. 5 is a schematic diagram of system 100, wherein active assembly 40L includes connector 41, such as 24f non-pinned MPO connectors, and wherein fiber optic cable 10 includes two pairs of connectors: 20AL and 20BL at one end and 20AR and 20BR at the other end. In an example embodiment, connectors 20 are 12f pinned MPO connectors. In an example embodiment, connectors 20 include multifiber ferrules 21.

Active assembly connector 41L is connected to fiber optic cable connectors 20AL and 20BL via patch cord 110L, and active assembly connector 41R is connected to fiber optic cable connectors 20AR and 20BR via patch cord 110R. Patch-cord connector 130L connects to active assembly connector 41L, and patch-cord connector 130R connects to MPO active assembly connector 41R. Patch-cord connectors 140AL and 140BL connect to fiber optic cable connectors 20AL and 20BL, while patch-cord connectors 140AR and 140BR connect to fiber optic cable connectors 20AR and 20BR. In an example embodiment, active assembly connectors 41 include a multifiber ferrule 43, and patch-cord connectors 130 and 140 include respective multifiber ferrules 131 and 141.

Patch-cord connector 130L has ports 24NP($x_L$) and patch-cord connector 130R has ports 24NP($x_R$), where $x_L$, $x_R$ denote the port numbers, for $1 \leq x_L, x_R \leq 24$. Likewise, fiber optic cable connectors 20AL and 20BL have respective ports 12PAL($y_{AL}$) and 12PBL($y_{BL}$) for $1 \leq y_{AL}, y_{BL} \leq 12$, while fiber optic cable connectors 20AR and 20BR have respective ports 12PAR($y_{AR}$) and 12PBR($y_{BR}$) for $1 \leq y_{AR}, y_{BR} \leq 12$. The letters "NP" and "P" in the connector reference numbers can in one example embodiment be understood to represent the case where the connectors having "no pins" and "pins," respectively. Generally, however, the letters "NP" and "P" are simply used to distinguish between the ports of the different connectors without regard to the pin configuration.

The method of establishing a suitable universal port configuration for harnesses 112 in patch cords 110 is now described with reference to FIG. 5. First, an initial (fiber) connection is made in patch cord 110L between any active-assembly-wise port 24NPL($x_L$) and any cable-wise port 12PAL($y_{AL}$) or 12 PBL($y_{BL}$). An end-to-end pairings method between active-assembly-wise ports 24NPL($x_L$) and 24NPR($x_R$) of respective patch-cord connectors 130L and 130R (which is based on a select pairing method between transceiver ports 42L↔42R, i.e., 01T↔01R, 02T↔02R, etc.) allows for the initial port connections to be carried through from active assembly connector 41L to active assembly connector 41R, i.e., from active-assembly-wise ports 24NPL($x_L$) of patch cord 110L to the corresponding active-assembly-wise ports 24NPR($x_R$) of patch cord 110R.

Note that fiber optic cable 10 maps cable-wise ports 12PAL ($y_{AL}$) and 12PBL($y_{BL}$) of patch cord 110L to ports 12PAR ($y_{AR}$) and 12PBR($y_{BR}$) of patch cord 110R so that each cable-wise port in one patch cord is connected to a corresponding cable-wise port of the other patch cord.

Set out in Table 1 is an example active assembly pairings method that defines how active-assembly-wise ports 24NPL ($x_L$) of patch-cord connector 130L are mapped to active-assembly-wise ports 24NPR($x_R$) of patch-cord connector 130R in a manner that maintains polarity based on mapping the transmit and receive transceiver ports (01T↔01R, 02T↔02R, etc.) between active assemblies 40L and 40R. An aspect of the assembly includes determining the pairings method if one already exists, or establishing a pairings method if one does not already exist.

TABLE 1

| PAIRINGS TABLE | | | | |
| --- | --- | --- | --- | --- |
| 24NPL($x_L$) | 24NPR($x_R$) | /// | 24NPL($x_L$) | 24NPR($x_R$) |
| 1 | 13 | /// | 13 | 1 |
| 2 | 14 | /// | 14 | 2 |
| 3 | 15 | /// | 15 | 3 |
| 4 | 16 | /// | 16 | 4 |
| 5 | 17 | /// | 17 | 5 |
| 6 | 18 | /// | 18 | 6 |
| 7 | 19 | /// | 19 | 7 |
| 8 | 20 | /// | 20 | 8 |
| 9 | 21 | /// | 21 | 9 |
| 10 | 22 | /// | 22 | 10 |
| 11 | 23 | /// | 23 | 11 |
| 12 | 24 | /// | 24 | 12 |

The pairings method can be expressed as follows:
24NPL($x_L$)↔24NPR($x_R$) for $1 \leq x_L \leq 12$ and $13 \leq x_R \leq 24$ and 24NPL($x_L$)↔24NPR($x_R$) for $13 \leq x_L \leq 24$ and $1 \leq x_R \leq 12$.

From the pairings method, it is seen, for example, that patch cord port 24NPL(4), which is associated with active assembly port 03R of active assembly connector 41L, is be connected to patch cord port 24NPR(16) of active assembly connector 41R which is associated with active assembly port 03T (see also FIG. 4). Thus, a fiber 36 from active-assembly-wise patch cord port 24NPL(4) that connects to cable-wise patch cord port 12PBL(4) is traced from patch cord port 12PBL(4) through fiber optic cable 10 over to cable-wise patch cord port 12PBR(9) and is then connected by another fiber 36 to active-assembly-wise patch cord port 24NPR(16). This connection pathway is then repeated in the opposite direction from active-assembly-wise patch cord port 24NPR (4) to active-assembly-wise patch cord port 24NPL(16) to form a corresponding connection pathway. This process is repeated for the unused ports until there are no more port connections to be made. The result is a polarity preserving universal optical connection between active assemblies 40L and 40R.

Figure 6:
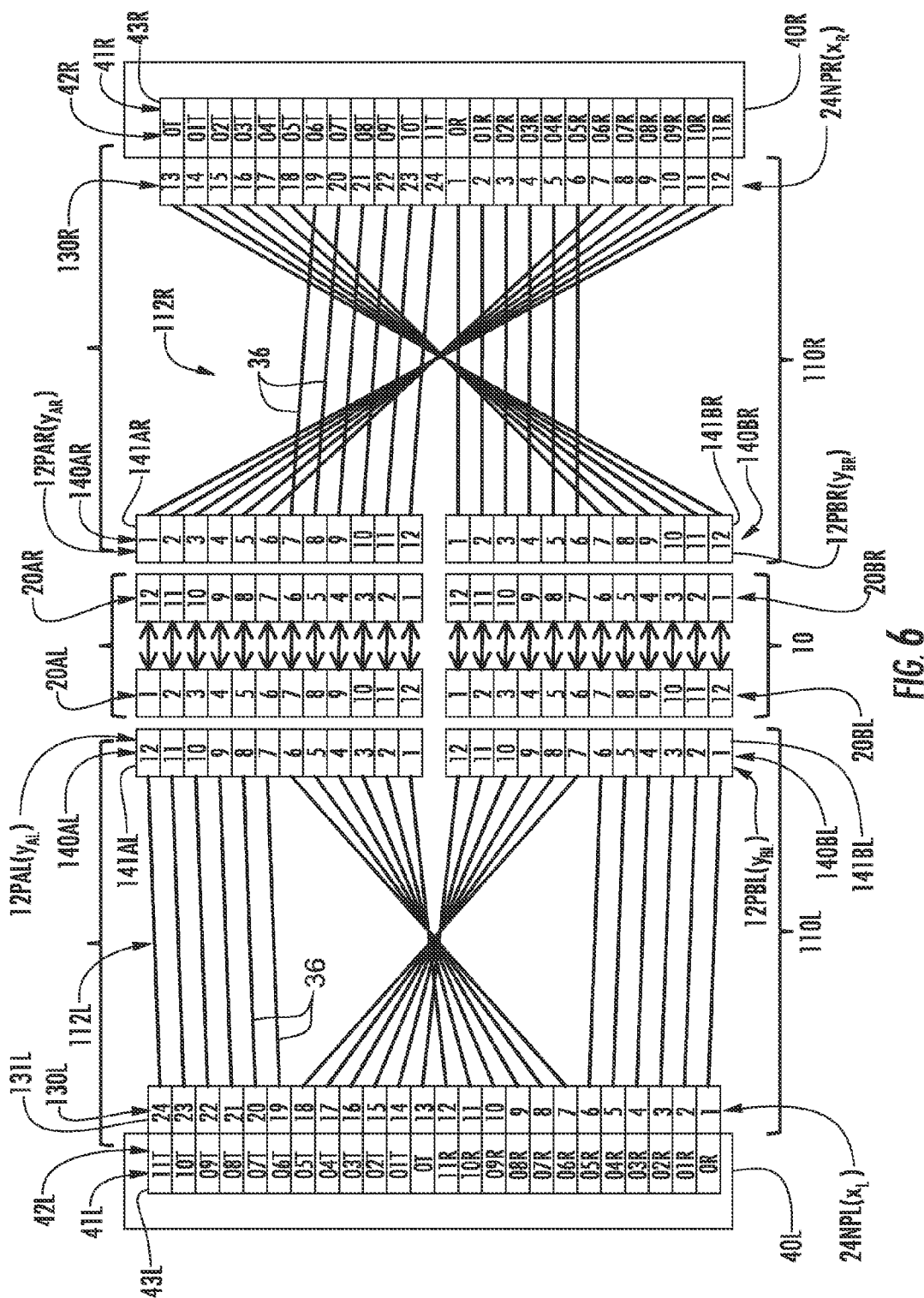
FIG. 6 shows example harness configurations for the system of FIG. 5 for the 24f↔2×12f assemblies.

FIG. 6 shows an example configuration of harness 112 for system 100 of FIG. 5 as established using the above-described method. The two harnesses 112L and 112R appear to have different configurations in the schematic representation shown FIG. 5. This is due to using a 2-dimensional representation to describe what is in fact a 3-dimensional embodiment. However, one skilled in the art will understand that the harness configurations are in fact the same, so that patch cords 110L and 110R are the same and provide a universal connection for fiber optic cable 10. This is illustrated in FIG. 7, which is a perspective view of an example harness 112 that connects multifiber patch-cord connectors 130 and 140.

In the example configuration of patch cord 110L of FIG. 6, fibers 36-7 through 36-12 and 36-19 through 36-24 are routed to 12f cable section 136A and fibers 36-1 through 36-6 and 36-13 through 36-18 are routed to 12f cable section 136B.

In an example embodiment, patch-cord connectors 140A and 140B are installed on respective 12f cable sections 136A and 136B with the following port configurations. In cable section 136A, fibers 36-7 through 36-12 are connected to patch-cord connector ports 12PAL(6) through 12PAL(1), respectively, and fibers 36-19 through 36-24 are connected to patch-cord connector ports 12PAL(7) through 12PAL(12), respectively. Similarly, in cable section 136B, fibers 36-1 through 36-6 connected to patch-cord connector ports 12PBL(1) through 12PAL(6), respectively, and fibers 36-13 through 36-18 are connected to patch-cord connector ports 12PAL(12) through 12PAL(7), respectively. This is the configuration shown schematically in FIG. 6. In an example embodiment, patch-cord connectors 130, 140A and 140B are processed (e.g., polished) in accordance with the particular connector preparation techniques.

FIG. 8 is an end-on view of active-assembly-wise 24f connector 130 illustrating how the connector ports 24NP can be divided up into a number of different groups G, such as groups G1 through G4. There are at least two ports per group G. Likewise, FIG. 9 is an end-on view of cable-wise 12f connectors 140A and 140B illustrating how the connector ports 12PA and 12PB can be divided up into different groups G' and G", such as groups G1' and G2', and G1" and G2". A variety of different groups G, G' and G" are can be made, such as pairs of connector ports, as shown by groups GP and GP" in FIG. 8. Also, two rows of six ports 12PA and two rows of six ports 12PB are shown for respective connectors 140A and 140B by way of illustration. Other port configurations are contemplated herein, such as one or both connectors 140A and 140B each having a single row of twelve ports.

Also, the various groups G, G' and G" can be combined into larger groups. For example, groups G1 and G3 of multifiber ferrule 131L can be combined to form an upper group GU, and groups G2 and G4 can be combined to form a lower receiving area GL.

With reference to FIG. 5 through FIG. 9, an example embodiment of the invention is fiber optic assembly 110 having a multifiber ferrule 131 at one end and two multifiber ferrules 141A and 141B at the other end. Multifiber ferrule 131 has one or more groups G of ports 24NP, while multifiber ferrules 141A and 141B respectively have one or more groups G' and G" of ports 12PA and 12PB. Multifiber ferrule 131 is arranged relative to multifiber ferrules 141A and 141B such that fibers 36 can optically connect ports 24NP to ports 12PA or 12PB. In an example embodiment, multifiber ferrule 131R has upper and lower groups GU and GL of twelve ports 24PL, while multifiber ferrules 141A and 141B respectively have upper and lower groups G1' and G2' and G1" and G2" of six ports 12PA and six ports 12PB.

In an example embodiment, at least one group G, at least one group G' and at least one group G" has six ports. In an example embodiment, at least one group G, at least one group G' and at least one group G" has two ports. In an example embodiment, at least one group G has twelve ports.

Groups G are said to be "directly facing" corresponding groups G' and G" if multifiber ferrule 131 can be arranged substantially in opposition to multifiber ferrules 141A and 141B. This may mean, for example, that harness 112 may be flexible (e.g., part of an optical fiber cable) and thus capable of being bent such that multifiber ferrule 131 and multifiber ferrules 141A and 141B can be placed in a number of relative orientations, including in opposition. Thus, in some cases fibers 36 can be connected to directly facing ports (e.g., port 24NPL(1) to 12PBL(1); see FIG. 6) without having to "flip" the fiber, i.e., without having to connect the fiber to a non-directly facing group. In other cases, fibers 36 are connected to non-directly facing ports by "flipping" the fibers (e.g., port 24NPL(7) to 12PAL(6); see FIG. 6).

In an example embodiment, ports 24NP of multifiber ferrule 131 generally face ports 12PA and 12PB of multifiber ferrules 141A and 141B. The various groups G can be aligned with each other from one ferrule to the other, with fibers 36 extending from at least two groups G of multifiber ferrule 131 to at least two groups G' and/or G" of multifiber ferrules 141A and/or 141B, thereby defining at least two groups of fibers 36 for harness 112.

In an example embodiment, fibers 36 connect at least one group G to a directly facing group G' or G" without having to cross or "flip" the fibers. In addition, at least one group G is flipped as it extends to group G' or G". In other embodiments, at least one of groups G is connected directly across to an essentially directly facing group G' or G", but the faces of the ferrules need not be parallel to each other. In yet other embodiments, at least one subgroup G is connected to at least one other group G' or G" wherein the connecting fibers 36 are flipped, and the connected group G' or G" is not a directly facing group.

With reference again to FIG. 3, in an example embodiment of patch cord 110, the 24f cable section 126 is a small-diameter interconnect cable containing twenty-four color-coded, e.g. 250 µm outside diameter, fibers 36. Fibers 36 are arranged within patch-cord connector 130 (e.g., within a connector ferrule, not shown) so that when viewing patch-cord connector 130 end on, such as shown in FIG. 10, key-up fibers 36-1 through 36-12 that make up the top row and run left to right (from Blue, Orange . . . Aqua, i.e., "B→A") while fibers 36-13 through 36-24 make up the bottom row and also run left to right as B→A.

As mentioned above, in an example embodiment, fibers 36 for the various optical interconnection assemblies considered herein may comprise bend-resistant (bend insensitive) optical fibers. Such fibers are advantageous because they preserve and provide optical performance not attainable with conventional fibers. In an example embodiment, fibers 36 can be multimode fibers, for example bend-resistant fibers, which provide stability for higher order modes that are otherwise unstable even for short fiber lengths. Consequently, bend-resistant fibers 36 allow for bending for installation, routing, slack storage, higher density and the like, thereby allowing rugged installations both by the craft and untrained individuals.

FIG. 11 shows a schematic representation of the refractive index profile of a cross-section of the glass portion of an embodiment of an exemplary multimode, bend-resistant optical fiber 36 comprising a glass core 37 and a glass cladding 42, the cladding comprising an inner annular portion 38, a depressed-index annular portion 39, and an outer annular portion 40. FIG. 12 is a schematic representation (not to scale) of a cross-sectional view of the optical fiber of FIG. 11. The core 37 has outer radius R1 and maximum refractive index delta Δ1MAX. The inner annular portion 38 has width W2 and outer radius R2. Depressed-index annular portion 39 has minimum refractive index delta percent Δ3MIN, width W3 and outer radius R3. The depressed-index annular portion 39 is shown offset, or spaced away, from the core 37 by the inner annular portion 38. The annular portion 39 surrounds and contacts the inner annular portion 38. The outer annular portion 40 surrounds and contacts the annular portion 39. The clad layer 42 is surrounded by at least one coating 44, which may in some embodiments comprise a low modulus primary coating and a high modulus secondary coating.

The inner annular portion 38 has a refractive index profile Δ2(r) with a maximum relative refractive index Δ2MAX, and a minimum relative refractive index Δ2MIN, where in some embodiments Δ2MAX=Δ2MIN. The depressed-index annular portion 39 has a refractive index profile Δ3(r) with a minimum relative refractive index Δ3MIN. The outer annular portion 40 has a refractive index profile Δ4(r) with a maximum relative refractive index Δ4MAX, and a minimum relative refractive index Δ4MIN, where in some embodiments Δ4MAX=Δ4MIN. Preferably, Δ1MAX>Δ2MAX>Δ3MIN.

In some embodiments, the inner annular portion 38 has a substantially constant refractive index profile, as shown in FIG. 11 with a constant Δ2(r); in some of these embodiments, Δ2(r)=0%. In some embodiments, the outer annular portion 40 has a substantially constant refractive index profile, as shown in FIG. 10 with a constant Δ4(r); in some of these embodiments, Δ4(r)=0%. The core 37 has an entirely positive refractive index profile, where Δ1(r)>0%. R1 is defined as the radius at which the refractive index delta of the core first reaches value of 0.05%, going radially outwardly from the centerline. Preferably, the core 37 contains substantially no fluorine, and more preferably the core 37 contains no fluorine.

In some embodiments, the inner annular portion 38 preferably has a relative refractive index profile Δ2(r) having a maximum absolute magnitude less than 0.05%, and Δ2MAX<0.05% and Δ2MIN >−0.05%, and the depressed-index annular portion 39 begins where the relative refractive index of the cladding first reaches a value of less than −0.05%, going radially outwardly from the centerline. In some embodiments, the outer annular portion 40 has a relative refractive index profile 44(r) having a maximum absolute magnitude less than 0.05%, and Δ4MAX<0.05% and Δ4 MIN >−0.05%, and the depressed-index annular portion 39 ends where the relative refractive index of the cladding first reaches a value of greater than −0.05%, going radially outwardly from the radius where Δ3MIN is found.

Example optical fibers 36 considered herein are multimode and comprise a graded-index core region and a cladding region surrounding and directly adjacent to the core region, the cladding region comprising a depressed-index annular portion comprising a depressed relative refractive index relative to another portion of the cladding. The depressed-index annular portion of the cladding is preferably spaced apart from the core. Preferably, the refractive index profile of the core has a curved shape, for one example, a generally parabolic shape.

The depressed-index annular portion may, for example, comprise a) glass comprising a plurality of voids, or b) glass doped with one or more downdopants such as fluorine, boron, individually or mixtures thereof. The depressed-index annular portion may have a refractive index delta less than about −0.2% and a width of at least about 1 micron, the depressed-index annular portion being spaced from said core by at least about 0.5 microns.

In some embodiments, the multimode optical fibers comprise a cladding with voids, the voids in some preferred embodiments are non-periodically located within the depressed-index annular portion. "Non-periodically located" means that if one takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match for each such cross section. That is, the voids are non-periodic, i.e., they are not periodically disposed within the fiber structure. These voids are disposed (elongated) along the length (i.e. generally parallel to the longitudinal axis) of the optical fiber, but do not necessarily extend the entire length of the entire fiber for typical lengths of transmission fiber. It is believed that at least some of the voids extend along the length of the fiber a distance less than about 20 meters, more preferably less than about 10 meters, even more preferably less than about 5 meters, and in some embodiments less than 1 meter.

The multimode optical fiber disclosed herein exhibits very low bend induced attenuation, in particular very low macrobending induced attenuation. In some embodiments, high bandwidth is provided by low maximum relative refractive index in the core, and low bend losses are also provided. Consequently, the multimode optical fiber may comprise a graded index glass core; and an inner cladding surrounding and in contact with the core, and a second cladding comprising a depressed-index annular portion surrounding the inner cladding, said depressed-index annular portion having a refractive index delta less than about −0.2% and a width of at least 1 micron, wherein the width of said inner cladding is at least about 0.5 microns and the fiber further exhibits a 1 turn, 10 mm diameter mandrel wrap attenuation increase of less than or equal to about 0.4 dB/turn at a wavelength of 850 nm ("850 nm"), a numerical aperture (NA) of greater than 0.14, more preferably greater than 0.17, even more preferably greater than 0.18, and most preferably greater than 0.185, and an overfilled bandwidth greater than 1.5 GHz-km at 850 nm. By way of example, the numerical aperture for the multimode optical fiber 36 is between about 0.185 and about 0.215.

Multimode fibers 36 having a 50 micron diameter core 37 can be made to provide (a) an overfilled (OFL) bandwidth of greater than 1.5 GHz-km, more preferably greater than 2.0 GHz-km, even more preferably greater than 3.0 GHz-km, and most preferably greater than 4.0 GHz-km at an 850 nm wavelength. By way of example, these high bandwidths can be achieved while still maintaining a 1 turn, 10 mm diameter mandrel wrap attenuation increase at an 850 nm wavelength of less than 0.5 dB, more preferably less than 0.3 dB, even more preferably less than 0.2 dB, and most preferably less than 0.15 dB. These high bandwidths can also be achieved while also maintaining a 1 turn, 20 mm diameter mandrel wrap attenuation increase at an 850 nm wavelength of less than 0.2 dB, more preferably less than 0.1 dB, and most preferably less than 0.05 dB, and a 1 turn, 15 mm diameter mandrel wrap attenuation increase at an 850 nm wavelength, of less than 0.2 dB, preferably less than 0.1 dB, and more preferably less than 0.05 dB. Such fibers are further capable of providing a numerical aperture (NA) greater than 0.17, more preferably greater than 0.18, and most preferably greater than 0.185. Such fibers are further simultaneously capable of exhibiting an OFL bandwidth at 1300 nm which is greater than about 500 MHz-km, more preferably greater than about 600 MHz-km, even more preferably greater than about 700 MHz-km. Such fibers are further simultaneously capable of exhibiting minimum calculated effective modal bandwidth (Min EMBc) bandwidth of greater than about 1.5 MHz-km, more preferably greater than about 1.8 MHz-km and most preferably greater than about 2.0 MHz-km at 850 nm.

Preferably, the multimode optical fiber disclosed herein exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, the multimode optical fiber disclosed herein exhibits a spectral attenuation of less than 1.0 dB/km at a wavelength of 130 nm ("1300 nm"), preferably less than 0.8 dB/km at 1300 nm, even more preferably less than 0.6 dB/km at 1300 nm.

In some embodiments, the core extends radially outwardly from the centerline to a radius R1, wherein $10 \leq R1 < 40$ microns, more preferably $20 \leq R1 \leq 40$ microns. In some embodiments, $22 \leq R1 \leq 34$ microns. In some preferred embodiments, the outer radius of the core is between about 22 to 28 microns. In some other preferred embodiments, the outer radius of the core is between about 28 to 34 microns.

In some embodiments, the core has a maximum relative refractive index, less than or equal to 1.2% and greater than 0.5%, more preferably greater than 0.8%. In other embodiments, the core has a maximum relative refractive index, less than or equal to 1.1% and greater than 0.9%.

In some embodiments, the optical fiber exhibits a 1 turn, 10 mm diameter mandrel attenuation increase of no more than 1.0 dB, preferably no more than 0.6 dB, more preferably no more than 0.4 dB, even more preferably no more than 0.2 dB, and still more preferably no more than 0.1 dB, at all wavelengths between 800 nm and 1400 nm. An example optical fiber 36 is also disclosed in U.S. patent application Ser. Nos. 12/250,987 filed on Oct. 14, 2008 and 12/333,833 filed on Dec. 12, 2008, the disclosures of which are incorporated herein by reference.

High-Speed Data-Rate Optical Transport System with 24f↔24f Interconnections

Figure 13:
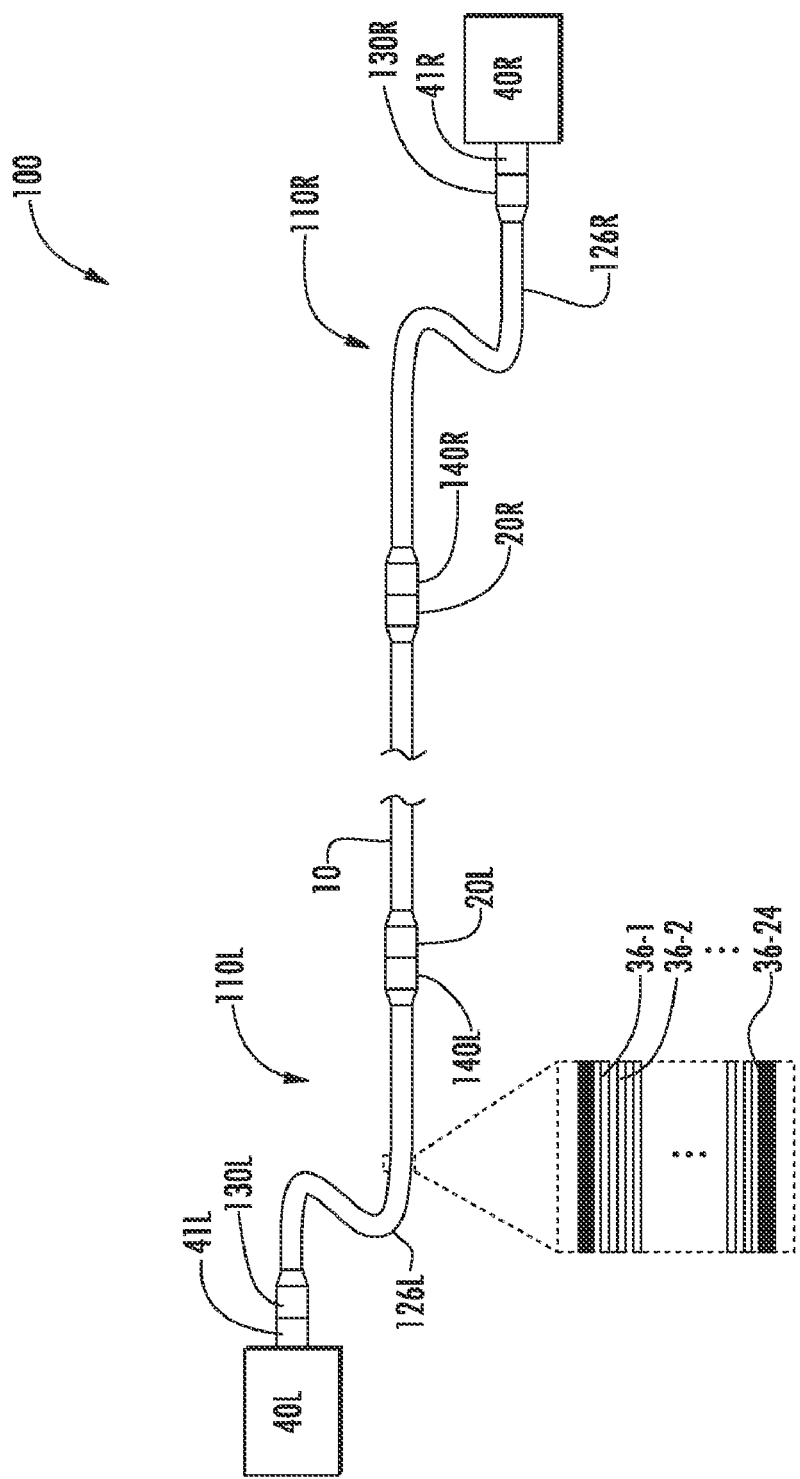
FIG. 13 is a schematic diagram of a high-speed data-rate optical transport system similar to that of FIG. 3, but that utilizes a 24f fiber optic cable and 24f patch cords.

FIG. 13 is a schematic diagram of system 100 similar to that of FIG. 3, but that utilizes a 24f fiber optic cable 10 with 24f connectors 20L and 20R, and 24f single-cable patch cords 110. Each patch cord 110 is terminated at its ends with respective 24f connectors 130. Patch-cord connector 130NP connects to active assembly connector 41, while patch-cord connector 130P connects to fiber optic cable connector 20.

Figure 14:
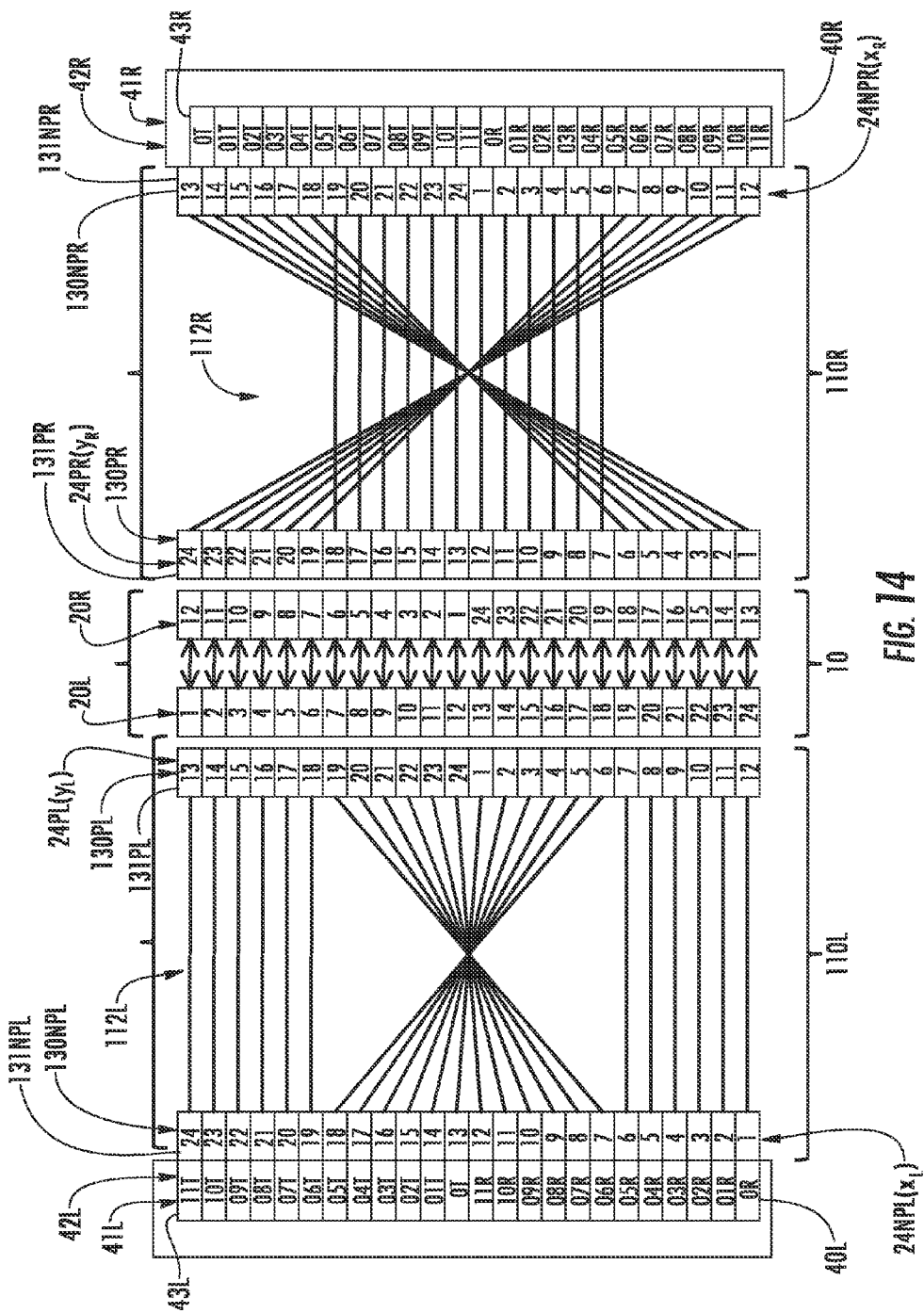
FIG. 14 is similar to FIG. 5, but represents the system of FIG. 13.

FIG. 14 is similar to FIG. 5, but represents system 100 of FIG. 13. The ports of patch-cord connector 130NPL are denoted $24NPL(x_L)$ as above, while the ports of patch-cord connector 130PL are denoted $24PL(y_L)$, where $1 \leq x_L$, $y_L \leq 24$. Likewise, the ports of patch-cord connector 130NPR are denoted $24NPR(x_R)$ as above, while the ports of patch-cord connector 130PR are denoted $24PR(y_R)$ where $1 \leq x_R$, $y_R \leq 24$.

The method of establishing a suitable universal port configuration for harness 112 for patch cord 110 is similar to that as described above in connection with the 24f↔2×12f assemblies. With reference to FIG. 8, first, an initial optical connection (e.g., with an optical fiber 36) is made in patch cord 110L between any active-assembly-wise patch cord port 24NPL ($x_L$) and any cable-wise patch cord port $12PL(y_L)$. The pairings method between patch cord ports $24NPL(x_L)$ of patch cord 110L and patch cord ports $24NPR(x_R)$ of patch cord 110R, along with the correspondence between cable-wise ports of the patch cords via fiber optic cable 10, allows for the initial port connection to be carried through from active assembly connector 41L to active assembly connector 41R.

From the pairings method as described above, it is seen for example that active-assembly-wise patch-cord port 24NPL (4) associated with active assembly receive port 03R is connected to active-assembly-wise patch-cord port 24NPR(16) associated with active assembly transmit port 03T. Thus, a fiber 36 from active-assembly-wise patch-cord port 24NPL (4) that connects to cable-wise patch-cord port 12PBL(4) is traced through fiber optic cable 10 over to cable-wise patch-cord port 12PBR(9) and is then connected by another fiber 36 to active-assembly-wise patch-cord port 24NPR(16). This connection pathway is then repeated in the opposite direction from active-assembly-wise patch-cord port 24NPR(4) to active-assembly-wise patch-cord port 24NPL(16) to form a corresponding connection pathway. This process can be repeated in partially connecting the available ports until all desired ports are connected, or in a full connecting method such that all existing ports are connected. FIG. 14 shows an example configuration for harnesses 112L and 112R for respective patch cords 110L and 110R as established using this method.

Figure 15:
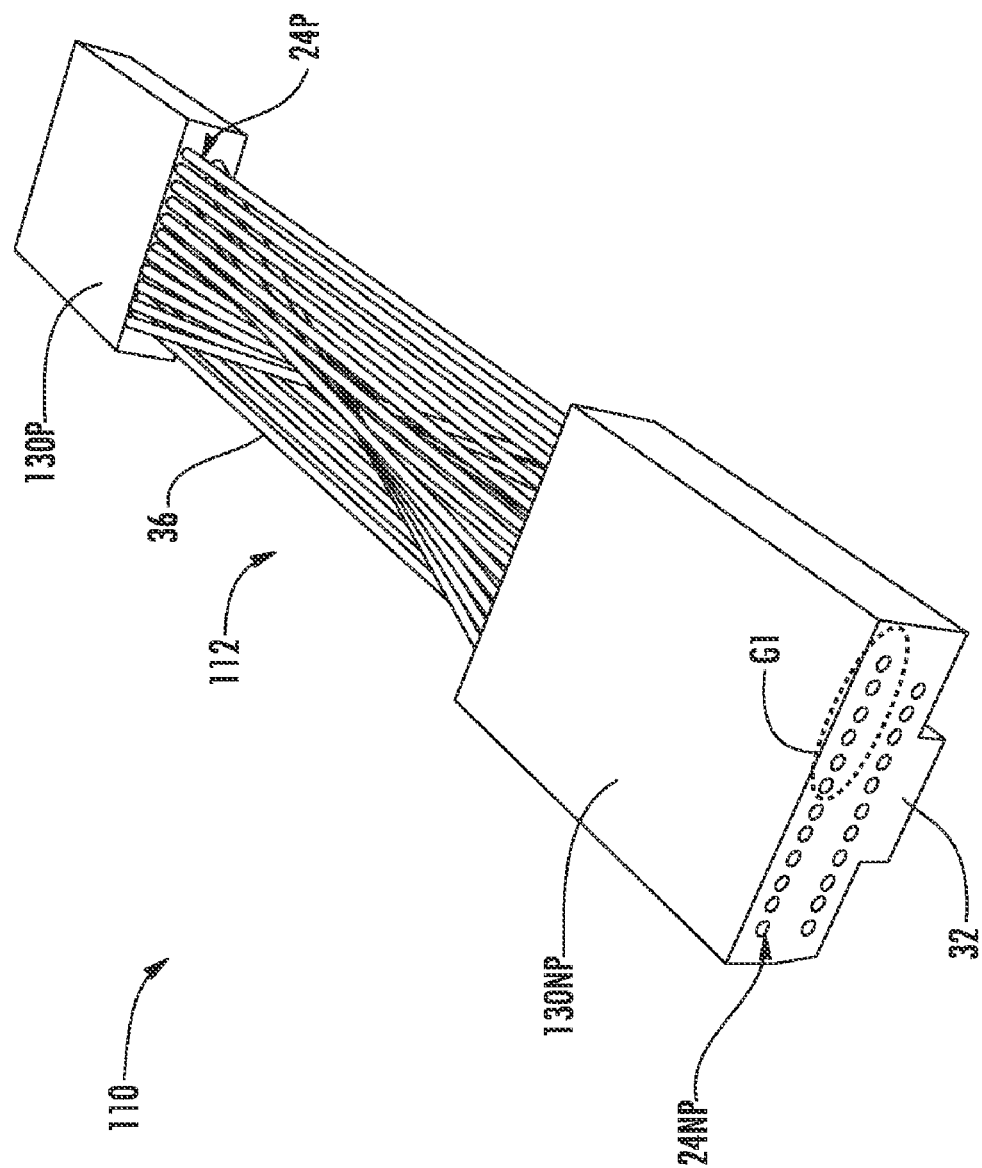
FIG. 15 is a perspective view similar to FIG. 7, except for the case of a 24f↔24f optical fiber interconnection assembly.

FIG. 15 is a perspective view similar to FIG. 7, except for the case of a 24f↔24f optical fiber interconnection assembly 100. Note that the port configuration on the hidden face of connector 130NP is shown on the near face for the sake of illustration. FIG. 16 and FIG. 17 are end-on views of the assembly-wise and cable-wise 24f connectors 130NP and 130P of the 24f↔24f optical fiber interconnection assembly 100, illustrating how the connector ports 24NP and 24P can be respectively divided up into a variety of different groups G and G' of two or more ports similar to the case of the 24f↔2×12f assembly described above.

Also, the various groups G and G' can be combined into larger groups. For example, groups G1 and G3 of multifiber ferrule 131 can be combined to form an upper group GU, and groups G2 and G4 can be combined to form a lower group GL.

With reference to FIG. 13 through FIG. 17, an example embodiment of the invention is fiber optic assembly 110 having a multifiber ferrule 131NP at one end and a multifiber ferrule 131P at the other end. Multifiber ferrule 131NP has one or more groups G of ports 24NP, while multifiber ferrule has one or more groups G' of ports 24P. Multifiber ferrule 131NP is arranged relative to multifiber ferrule 131P such that fibers 36 can optically connector ports 24NP to ports 24P. In an example embodiment, multifiber ferrule 131NP has upper and lower groups GU and GL of twelve ports 24NP, while multifiber ferrule 131P respectively has upper and lower groups GU' and GL' of twelve ports 24P.

In an example embodiment, at least one group G and at least one group G' has twelve ports. In another example embodiment, at least one group G and at least one group G' has six ports. In another example embodiment, at least one group G and at least one group G' has two ports.

Groups G are said to be "directly facing" corresponding groups G' if multifiber ferrule 131NP can be arranged substantially in opposition to multifiber ferrules 131P. This may mean, for example, that harness 112 may be flexible (e.g., part of an optical fiber cable) and thus capable of being bent such that multifiber ferrule 131NP and multifiber ferrule 131P can be placed in a number of relative orientations, including in opposition. Thus, in some cases fibers 36 can be connected to directly facing ports (e.g., port 24NPL(6) to 24PL(7); see FIG. 14) without having to "flip" the fiber, i.e., without having to connect the fiber to a non-directly facing group. In other cases, fibers 36 are connected to non-directly facing ports by "flipping" the fibers (e.g., port 24NPL(7) to 24PL(19); see FIG. 14).

In an example embodiment, ports 24NP of multifiber ferrule 131NP generally face ports 24P of multifiber ferrule 131P. The various groups G and G' can be aligned with each other from one ferrule to the other, with fibers 36 extending from at least two groups G of multifiber ferrule 131NP to at least two groups G' of multifiber ferrule 131P, thereby defining at least two groups of fibers 36 for harness 112.

In an example embodiment, fibers 36 connect at least one group G to a directly facing subgroup G' without having to cross or "flip" the fibers. In addition, at least one group G is flipped as it extends to group G'. In other embodiments, at least one of groups G is connected directly across to an essentially directly facing group G', though the faces of the ferrules need not be parallel to each other. In yet other embodiments, at least one group G is connected to at least one other group G', wherein the connecting fibers 36 are flipped, and the connected group G' is not a directly facing group.

Note that for the 24f↔24f assemblies 110 discussed here as well as for the case of the 24f↔2×12f assemblies discussed above, correspondingly labeled groups (G1, G1', etc.) need not directly face one another, and may not face one another depending on how one chooses to label the various groups for the two connectors. For example, with reference to FIGS. 16 and 17, the groups for connectors 130NP and 130P are labeled in a corresponding manner when each is viewed face on. However, when these connectors are placed face to face, groups G1 and G3 respectively face group G3' and G1' along the top row, and groups G2 and G4 respectively face groups G4' and G2' along the bottom row.

Generalized Method

Figure 18:
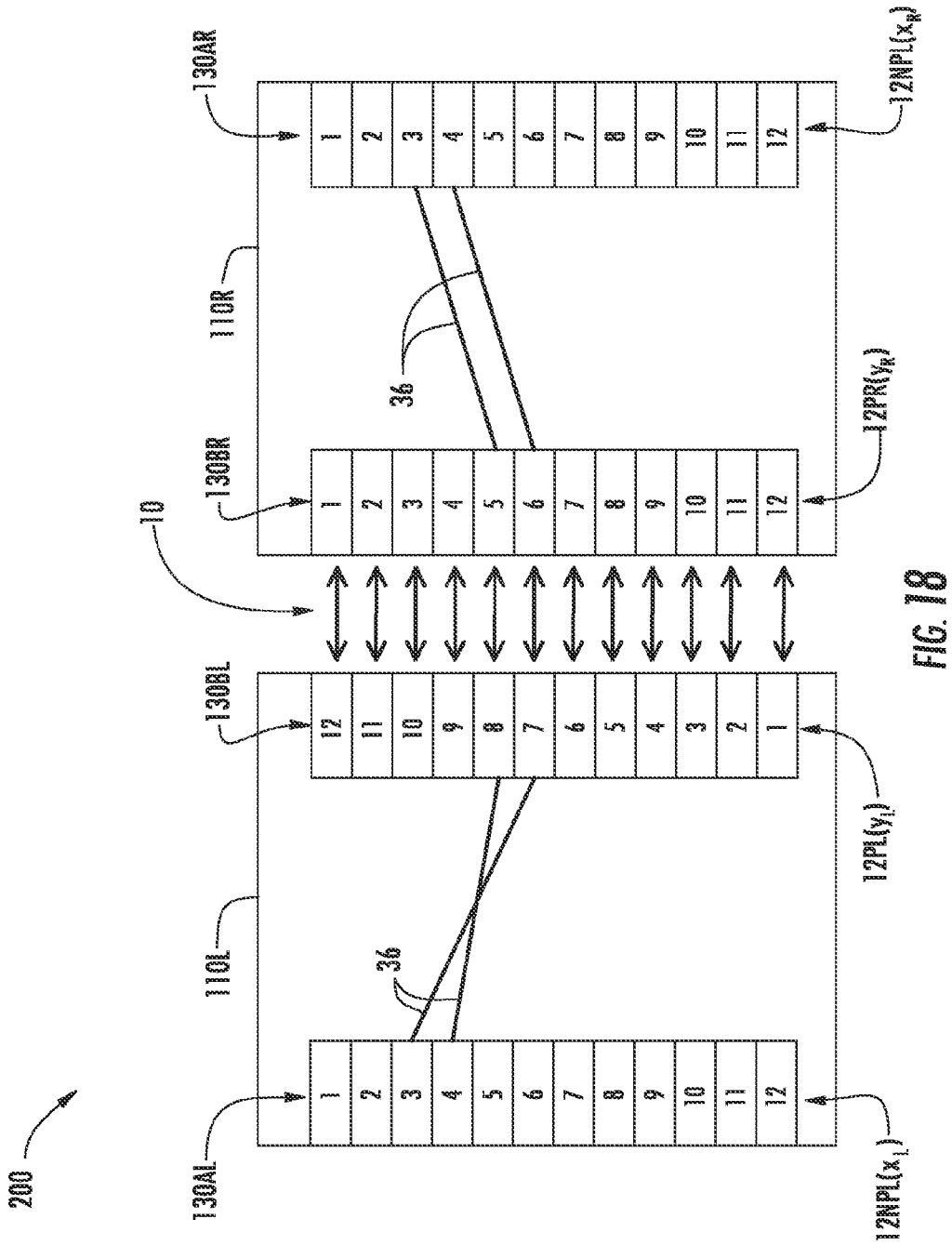
FIG. 18 is a schematic diagram of a generalized 12f interconnection system in the process of being interconnected, where the system includes two 12f↔12f optical interconnection assemblies.

FIG. 18 is a schematic diagram of a generalized 12f interconnection system 200 that includes two 12f↔12f assemblies 110L and 110R shown in the process of being interconnected with fibers 36. The 12f↔12f assembly 110L includes at the active assembly end a connector 130AL with single-fiber ports 12NPL($x_L$), and at the fiber optic cable end a connector 130BL with ports 12PL($y_L$), for $1 \leq x_L, y_L \leq 12$. Likewise, 12f↔12f assembly 110R includes at the active assembly end a connector 130AR with single-fiber ports 12NPL($x_R$), and at the fiber optic cable end a connector 130BR with ports 12PR($y_R$), for $1 \leq x_R, y_R \leq 12$. Cable-wise patch-cord connectors 130BL and 130BR are optically connected via fiber optic cable 10. Active-assembly-wise single-fiber ports 12NP within each active-assembly-wise connector 130AL and 130AR may be paired, i.e., {12NPL(1), 12NPL(2)}, {12NPL(3), 12NPL(4)}.

An example pairings method between active-assembly-wise ports 12NPL($x_L$) and active-assembly-wise ports 12NPR($x_R$) based on a polarity-preserving connection between the active assemblies (not shown) is provided in the pairings table below (Table 2):

TABLE 2

| Single-port pairings | |
|---|---|
| 12NPL($x_L$) | 12NPR($x_R$) |
| 1 | 2 |
| 2 | 1 |
| 3 | 4 |
| 4 | 3 |
| 5 | 6 |
| 6 | 5 |
| 7 | 8 |
| 8 | 7 |
| 9 | 10 |
| 10 | 9 |
| 11 | 12 |
| 12 | 11 |

The pairings method can be expressed as follows:
  12NPL($x_L$)↔12NPR($x_R$) for $1 \leq x_L \leq 12$ ODD and $1 \leq x_R \leq 12$ EVEN and 12NPL($x_L$)↔12NPR($x_R$) for $1 \leq x_L \leq 12$ EVEN and $1 \leq x_R \leq 12$ ODD.

Active-assembly-wise ports 12NPL($x_L$) and 12NPR($x_R$) are connected with fibers 36 using the following rule: When in assembly 110L, active-assembly-wise port 12NPL($x_L$) is routed to cable-wise patch-cord port 12PL($y_L$=n), then active-assembly-wise port 12NPR($x_R$) (as determined from the established pairings) in assembly 110R is be connected (routed) to cable-wise port 12PR($y_R$=m+1−n), where m is the total number of active assembly ports or fibers 36 (e.g., m=12 in this example). This process is repeated for all the remaining connector ports.

Figure 19:
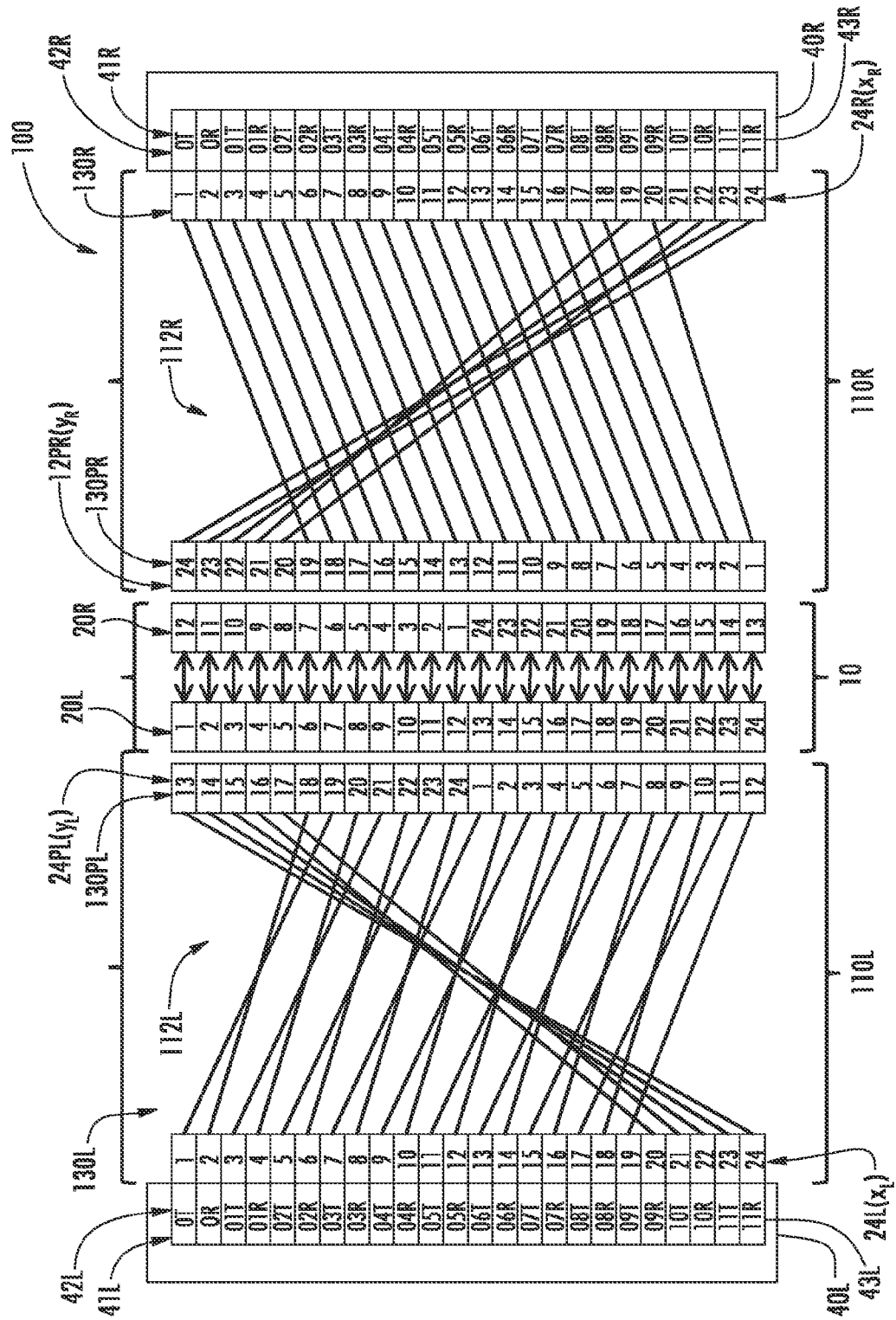
FIG. 19 is a schematic diagram of a high-speed data-rate optical transport system that includes two 24f↔24f optical interconnection assemblies and active assemblies having twenty-four single-fiber ports.

Thus, with reference to FIG. 19, active-assembly-wise assembly port 12NPL(4) in assembly 110L is paired to active-assembly-wise assembly port 12NPR(3) in assembly 110R via the given pairings method, so that $y_L$=n=3. Active-assembly-wise assembly port 12NPL(4) is connected to cable-wise port 12PL(8) by choice, so that $y_L$=n=8. Thus, active-assembly-wise port 12NPR(y=3) in assembly 110R is connected to cable-wise port 12PR($y_R$=12+1−8)=12PR(5), as shown. Likewise, active-assembly-wise port 12NPL(3) in assembly 110R is paired to active-assembly-wise port 12NPR(4) in assembly 110L. Thus, active-assembly-wise port 12NPL(3) is connected to cable-wise port 12PL(7) by choice, so that $y_L$=n=7. Thus, active-assembly-wise port 12NPR(4) is connected to cable-wise port 12PR($y_R$=12+1−7)=12PR(6), as shown.

The above interconnection method has been described in connection with a 12f interconnection system for the sake of illustration. One skilled in the art will appreciate that the method applies in principle to interconnection systems and interconnection assemblies that use any reasonable number m of fibers.

Thus, in the general case of active-assembly-wise assembly ports mNPL($x_L$) and mNPR($x_R$), where m is an even number of ports (i.e., m=12 or 24 in the above examples), the pairings method is generally expressed as:
  mNPL($x_L$)↔mNPR($x_R$) for $1 \leq x_L \leq m$ ODD and $1 \leq x_R \leq m$ EVEN and mNPL($x_L$)↔mNPR($x_R$) for $1 \leq x_L \leq m$ EVEN and $1 \leq x_R \leq m$ ODD.

24f Universal Module with Single-Fiber Ports

FIG. 19 is a schematic diagram of a high-speed data-rate optical transport system 100 that includes two 24↔24f optical interconnection assemblies 110 and active assemblies 40 having single-fiber ports 24. In an example embodiment, the two optical interconnection assemblies 110 include a modular enclosure called a "breakout module." Optical interconnection assemblies 110 are connected by a 24f fiber optic cable 10. Optical interconnection assemblies 110L and 110R respectively include a set of twenty-four active-assembly-wise single-fiber ports 24L($x_L$) and 24R($x_R$) that are mapped to (i.e., correspond to) each other via the pairings method as set out in Table 3 below:

TABLE 3

| PAIRINGS TABLE | | | | |
|---|---|---|---|---|
| 24L($x_L$) | 24R($x_R$) | - | 24L($x_L$) | 24R($x_R$) |
| 1 | 2 | - | 13 | 14 |
| 2 | 1 | - | 14 | 13 |
| 3 | 4 | - | 15 | 16 |
| 4 | 3 | - | 16 | 15 |
| 5 | 6 | - | 17 | 18 |
| 6 | 5 | - | 18 | 17 |
| 7 | 8 | - | 19 | 20 |
| 8 | 7 | - | 20 | 19 |
| 9 | 9 | - | 21 | 22 |
| 10 | 10 | - | 22 | 21 |
| 11 | 12 | - | 23 | 24 |
| 12 | 11 | - | 24 | 23 |

The above pairings method can also be expressed as follows:
  24L($x_L$)↔24R($x_R$) for $1 \leq x_L \leq 24$ ODD and $1 \leq x_R \leq 24$ EVEN and 24L($x_L$)↔24R($x_R$) for $1 \leq x_L \leq 24$ EVEN and $1 \leq x_R \leq 24$ ODD.

The same general interconnection method as described above for configuring the harnesses 112 of the 24f patch cords 110 is used here to configure harnesses 112L and 112R in optical interconnection assemblies 110. First, an initial (fiber) connection is made in optical interconnection assembly 110L between any single-fiber active-assembly-wise port 24L($x_L$)

and any cable-wise port 24PL($y_L$). From the pairings method it is seen, for example, that active-assembly-wise single-fiber port 24L(4) associated with active assembly receive port 03R in assembly 110L is be connected to active-assembly-wise port 24R(3) associated with active assembly transmit port 03T in assembly 110R. Thus, a fiber 36 from active-assembly-wise port 24L(7) that connects to cable-wise port 24PL(1) in assembly 110L is traced through fiber optic cable 10 over to optical interconnection assembly 110R and cable-wise port 24PR(12). This cable-wise port is then connected by another fiber 36 to active-assembly-wise port 24NPR(8) in optical interconnection assembly 110R.

Note that the optical connection is from transmit port 03T to receive port 03R in respective active assembly connectors 41L and 41R so that the polarity of the connection is preserved. This connection pathway is then repeated in the opposite direction from active-assembly-wise port 24R(7) in optical interconnection assembly 110R to active-assembly-wise port 24L(8) in optical interconnection assembly 110L, thereby connecting transmit port 03T of active assembly connector 41R to receive port 03R of active assembly connector 41L.

This method is repeated for the unused ports until there are no more port connections to be made. FIG. 19 shows example configurations for completed harnesses 112L and 112R in respective optical interconnection assemblies 110 established using this iterative approach.

Figure 20:
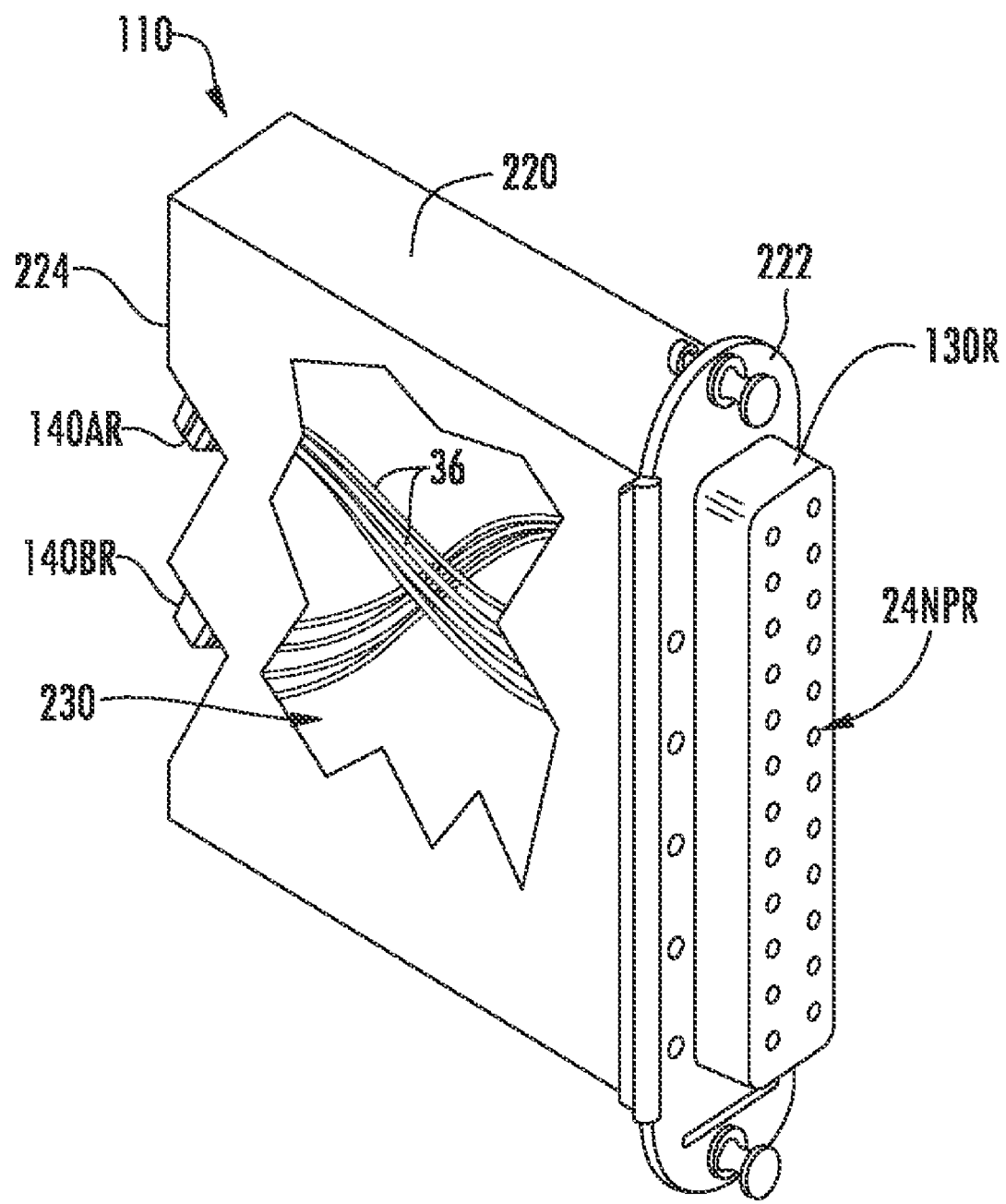
FIG. 20 is a perspective view of an example modular 24f↔2×12f optical interconnection assembly.

FIG. 20 is a perspective view of an example modular 24f↔2×12f optical interconnection assembly 110. Assembly 110 includes a housing 220 having first and second ends 222 and 224 and that defines an interior 230. Housing 220 may be made of metal, such comprise a stamped-formed metal box. Housing first end 222 includes active-assembly-wise 24f connector 130R with ports 24NPR, and housing second end 224 includes cable-wise connectors 140AR and 140BR. Connectors 140AR and 140BR are connected to connector 130R by fibers 36 that span housing interior 230 and that are configured using the methods described above.

The disclosure in other embodiments includes a fiber optic assembly with multifiber connectors each having a multifiber ferrule disposed therein so that the assembly has first and second multifiber ferrules. A group of ports is optically connected without flipping the optical fibers, and a group of ports is optically connected by flipping the optical fibers. The ports are each arranged in rows formed in each ferrule, with the rows being generally parallel to each other, such that each ferrule has a row being a lower row and a row being an upper row. See for example FIGS. 7-9 and FIGS. 15-17 and the disclosure relating thereto. At least one group of ports is optically connected by flipping the optical fibers having a first group of flipped optical fibers. The assembly can further have a second group of flipped optical fibers extending from the termination side of the first ferrule to the termination side of the second ferrule. The first and second groups of flipped optical fibers cross each other as the groups extend from the first ferrule to the second ferrule. The at least one group of ports that is optically connected without flipping the optical fibers can be located on a lower row of the first ferrule, and the group of ports that is optically connected by flipping the optical fibers can be located on an upper row of the first ferrule. The group of ports that is optically connected without flipping the optical fibers can be located on an upper row of the first ferrule, and the at least one group of ports that are optically connected by flipping the optical fibers can be located on an lower row of the first ferrule. The group of ports that are optically connected without flipping the optical fibers and the group of ports that are optically connected by flipping the optical fibers can be located on one of the same rows of a ferrule or different rows of a ferrule. Other combinations within the disclosure of the present invention are possible as well.

The present disclosure has been described with reference to the foregoing embodiments, which embodiments are intended to be illustrative of the present inventive concepts rather than limiting. Persons of ordinary skill in the art will appreciate that variations and modifications of the foregoing embodiments may be made without departing from the scope of the appended claims.

What is claimed is:

1. A method of configuring first and second optical interconnection assemblies for connecting, in a polarity-preserving manner, first or second multi-fiber active assemblies to a fiber optic cable in a high-speed data-rate optical transport system, the method comprising:
   a) defining active-assembly-wise and cable-wise connector ports for the first and second assemblies, wherein the first and second cable-wise ports correspond via the fiber optic cable;
   b) determining or establishing a pairing method between the active-assembly-wise ports of the first and second assemblies based on preserving polarity between corresponding transmit ports {0T, 01T, ... 23T} and receive ports {0R, 01R, ... 23R} of the first and second assemblies, wherein the pairing method comprises:
      determining a group of two or more transmit ports and a group of two or more receive ports for the active-assembly-wise ports,
      determining a group of two or more transmit ports and a group of two or more receive ports for the cable-wise-connector ports, and
      determining whether a group of active assembly-wise ports is directly facing a group of cable-wise ports;
   c) optically connecting in the first assembly one of the groups of active-assembly-wise ports to one of the groups of the cable-wise ports as a first set of connected ports, wherein the fibers in the first set are flipped if the group of active-assembly-wise ports in the first set are not directly facing the group of cable-wise-connector ports in the first set, and wherein the fibers in the first set are not flipped if the group of active-assembly-wise ports in the first set are directly facing the group of cable-wise-connector ports in the first set;
   d) optically connecting in the second assembly one of the groups of cable-wise-connector ports to one of the groups of active-assembly-wise ports as a second set of connected ports, wherein the group of cable-wise-connector ports in the first set correspond to the group of assembly-wise ports in the second set, and wherein the fibers in the second set are flipped if the group of active-assembly-wise ports in the second set are not directly facing the group of cable-wise-connector ports in the second set, and wherein the fibers in the second set are not flipped if the group of active-assembly-wise ports in the second set are directly facing the group of cable-wise-connector ports in the second set;
   e) performing acts c) and d) in the opposite direction from the second assembly to the first assembly; and
   f) repeating acts c) through e) for the remaining unconnected assembly ports.

2. The method of claim 1, wherein the active-assembly-wise ports of the first and second assemblies are defined as 24NPL($x_L$) and 24NPR($x_R$), and wherein the pairings method is defined as either:

a) 24NPL($x_L$)↔24NPR($x_R$) for $1 \leq x_L \leq 12$ and $13 \leq x_R \leq 24$ and 24NPL($x_L$)↔24NPR($x_R$) for $13 \leq x_L \leq 24$ and $1 \leq x_R \leq 12$; or b) 24L($x_L$)↔24R($x_R$) for $1 \leq x_L \leq 24$ ODD and $1 \leq x_R \leq 24$ EVEN and 24L($x_L$)↔24R($x_R$) for $1 \leq x_L \leq 24$ EVEN and $1 \leq x_R \leq 24$ ODD.

3. The method of claim 1, wherein the optical connections in the first and second assemblies respectively define first and second optical fiber harnesses.

4. The method of claim 3, wherein the first harness is contained within a first optical fiber cable.

5. The method of claim 4, including forming the first optical fiber cable from a cable section containing twenty-four fibers, two cable sections each containing twelve of the twenty-four fibers, and a furcation member connecting the two twelve-fiber cable sections to the twenty-four fiber cable section, with the furcation member containing the first harness.

6. The method of claim 1, wherein the fiber optical cable includes twenty-four optical fibers carried by two twelve-fiber (12f) cable sections each terminated by respective 12f MTP connectors, and wherein the cable-wise connector ports of the first and second assemblies are respectively supported by pairs of 12f MTP connectors.

7. The method of claim 1, wherein the fiber optic cable includes twenty-four optical fibers carried by a single cable terminated at its ends by respective 24f connectors, and wherein the cable-wise connector ports of the first and second assemblies are respectively supported by single 24f connectors.

8. A method of connecting first and second transceivers to a fiber optic cable in a high-speed data-rate optical transport system, comprising:
   a) providing a first optical interconnection assembly having active-assembly-wise ports 24NPL($x_L$) for $1 \leq x_L \leq 24$ and cable-wise ports 12PAL($y_{AL}$) and 12PBL($y_{BL}$) for $1 \leq y_{AL}, y_{BL} \leq 12$;
   b) providing a second optical interconnection assembly having active-assembly-wise ports 24NPR($x_R$) for $1 \leq x_R \leq 24$ and cable-wise ports 12PAR($y_{AR}$) and 12PBR($y_{BR}$) for $1 \leq y_{AR}, y_{BR} \leq 12$, wherein the cable-wise ports of the first and second assemblies correspond to each other via the fiber optic cable;
   c) determining or establishing a pairings method between active-assembly-wise ports 24NPL($x_L$) and 24NPL($x_R$) based on preserving polarity between corresponding transmit ports {0T, 01T, . . . 23T} and receive ports {0R, 01R, . . . 23R} of the first and second transceivers;
   d) forming in the first assembly a first optical connection between one of the active-assembly-wise ports 24NPL($x_L$) and any of the unconnected cable-wise connector ports 12PAL($y_{AL}$) or and 12PBL($y_{BL}$);
   e) forming in the second assembly a second optical connection between the cable-wise port 12PAR($y_{AR}$) or 12PBR($y_{BR}$) that corresponds to the connected cable-wise port 24PL($y_L$) of act c) and active-assembly-wise port 24NPR($x_R$) as defined by the polarity preserving relationship;
   f) repeating the optical connections formed in e) from active-assembly-wise port 24NPR($x_R$) to active-assembly-wise port 24NPL($x_L$); and
   g) repeating acts d) through f) for the unconnected active-assembly-wise and cable-wise ports of the first and second assemblies until all active-assembly-wise ports 24NPL($x_L$) and 24NPR($x_R$) are optically connected, thereby optically connecting four or more ports without flipping the fibers, and connecting some ports by flipping the fibers, wherein the fiber optic cable comprises two optical fiber cable sections that carry twelve fibers each and that are each terminated at their respective ends by twelve-fiber (12f) connectors, and including supporting the cable-wise ports 12PAL($y_{AL}$) and 12PBL($y_{BL}$) with two 12f connectors and the cable-wise ports 12PAR($y_{AL}$) and 12PBR($y_{BL}$) with two 12f connectors.

9. The method of claim 8, wherein the pairings method is defined by either:
   a) 24NPL($x_L$)↔24NPR($x_R$) for $1 \leq x_L \leq 12$ and $13 \leq x_R \leq 24$, and 24NPL($x_L$)↔24NPR($x_R$) for $13 \leq x_L \leq 24$ and $1 \leq x_R \leq 12$; or
   b) 24NPL($x_L$)↔24NPR($x_R$) for $1 \leq x_L \leq 24$ ODD and $1 \leq x_R \leq 24$ EVEN and 24NPL($x_L$)↔24NPR($x_R$) for $1 \leq x_L \leq 24$ EVEN and $1 \leq x_R \leq 24$ ODD.

10. The method of claim 8, wherein the 12f connectors comprise MTP connectors.

11. The method of claim 8, including forming the first and second optical connections using optical fibers.

12. The method of claim 11, wherein the first and second optical fiber connections define first and second optical fiber harnesses contained in respective first and second optical fiber cables.

13. A method of forming a fiber optic assembly for a high-speed data-rate optical transport system having active assemblies each with transmit and receive ports, comprising:
   providing at least first and second multifiber connectors each having respective pluralities of first and second ports that define respective pluralities of at least first and second groups of at least two ports each, wherein the first and second multifiber connectors are capable of being disposed so that the at least first and second groups of ports are located on respective termination sides of each ferrule; and
   connecting the first and second ports with a plurality of optical fibers according to a pairings method that maintains polarity between the transmit and receive ports of the active assemblies, including optically connecting at least one of the first and second groups of ports without flipping the fibers, and including optically connecting at least one of the first and second groups of ports by flipping the fibers.

14. The method of claim 13, further comprising:
   a) disposing within each connector at least one multifiber ferrule so that the fiber optic assembly comprises first and second multifiber ferrules;
   b) arranging the at least one of the first and second groups of ports that are optically connected without flipping the optical fibers, and the at least one of the first and second groups of ports that are optically connected by flipping the optical fibers in rows formed in each ferrule, the rows being generally parallel to each other, such that each ferrule has a row being a lower row and a row being an upper row;
   c) locating the at least one of the first and second groups of ports that is optically connected without flipping the optical fibers on a lower row of the first ferrule; and
   d) locating the at least one of the first and second groups of ports that is optically connected by flipping the optical fibers on an upper row of the first ferrule.

15. The method of claim 13, further comprising:
   a) disposing within each connector at least one multifiber ferrule so that the fiber optic assembly comprises first and second multifiber ferrules;

b) arranging the at least one of the first and second groups of ports that are optically connected without flipping the optical fibers, and the at least one of the first and second groups of ports that are optically connected by flipping the optical fibers in rows formed in each ferrule, the rows being generally parallel to each other, such that each ferrule has a row being a lower row and a row being an upper row;

c) locating the at least one of the first and second groups of ports that is optically connected without flipping the optical fibers on an upper row of the first ferrule; and d) locating the at least one of the first and second groups of ports that is optically connected by flipping the optical fibers on a lower row of the first ferrule.

16. The method of claim 13, further comprising:

a) disposing within each connector at least one multifiber ferrule so that the fiber optic assembly comprises first and second multifiber ferrules;

b) arranging the at least one of the first and second groups of ports that are optically connected without flipping the optical fibers, and the at least one of the first and second groups of ports that are optically connected by flipping the optical fibers in rows formed in each ferrule, the rows being generally parallel to each other, such that each ferrule has a row being a lower row and a row being an upper row; and c) locating the at least one of the first and second groups of ports that is optically connected without flipping the optical fibers and the at least one of the first and second groups of ports that is optically connected by flipping the optical fibers on the same row of the first ferrule.

17. The method of claim 13, further comprising:

a) disposing within each connector at least one multifiber ferrule so that the fiber optic assembly comprises first and second multifiber ferrules;

b) arranging the at least one of the first and second groups of ports that are optically connected without flipping the optical fibers, and the at least one of the first and second groups of ports that are optically connected by flipping the optical fibers in rows formed in each ferrule, the rows being generally parallel to each other, such that each ferrule has a row being a lower row and a row being an upper row; and c) locating the at least one of the first and second groups of ports that is optically connected without flipping the optical fibers and the at least one of the first and second groups of ports that is optically connected by flipping the optical fibers on different rows of the first ferrule.

18. The method of claim 13, further comprising:

a) disposing within each connector at least one multifiber ferrule so that the fiber optic assembly comprises first and second multifiber ferrules;

b) arranging the at least one of the first and second groups of ports that are optically connected without flipping the optical fibers, and the at least one of the first and second groups of ports that are optically connected by flipping the optical fibers in rows formed in each ferrule, the rows being generally parallel to each other, such that each ferrule has a row being a lower row and a row being an upper row; and c) extending the at least one of the first and second groups of ports that are optically connected without flipping the optical fibers from a lower row of the first ferrule to a lower row of the second ferrule.

19. The method of claim 13, further comprising:

a) disposing within each connector at least one multifiber ferrule so that the fiber optic assembly comprises first and second multifiber ferrules;

b) arranging the at least one of the first and second groups of ports that are optically connected without flipping the optical fibers, and the at least one of the first and second groups of ports that are optically connected by flipping the optical fibers in rows formed in each ferrule, the rows being generally parallel to each other, such that each ferrule has a row being a lower row and a row being an upper row; and c) extending the at least one of the first and second groups of ports that are optically connected by flipping the optical fibers from a lower row of the first ferrule to an upper row of the second ferrule.

20. The method of claim 13, further comprising:

a) disposing within each connector at least one multifiber ferrule so that the fiber optic assembly comprises first and second multifiber ferrules;

b) arranging the at least one of the first and second groups of ports that are optically connected without flipping the optical fibers, and the at least one of the first and second groups of ports that are optically connected by flipping the optical fibers in rows formed in each ferrule, the rows being generally parallel to each other, such that each ferrule has a row being a lower row and a row being an upper row;

c) the at least one of the first and second groups of ports that are optically connected by flipping the optical fibers comprising a first group of flipped optical fibers;

d) extending a second group of flipped optical fibers from the termination side of the first ferrule to the termination side of the second ferrule; and e) crossing the first and second groups of flipped optical fibers as the groups extend from the first ferrule to the second ferrule.

* * * * *